United States Patent [19]

Gallo

[11] 4,181,817
[45] Jan. 1, 1980

[54] HIGH BIT RATE DIGITAL DATA SIGNAL TRANSMISSION SYSTEM

[75] Inventor: Luigi C. Gallo, Redwood City, Calif.
[73] Assignee: Ampex Corporation, Redwood, Calif.
[21] Appl. No.: 763,762
[22] Filed: Jan. 28, 1977
[51] Int. Cl.$^2$ ............................................. H04L 1/00
[52] U.S. Cl. ...................................... 178/68; 325/42; 360/41
[58] Field of Search ................. 178/68, 69 R; 360/40, 360/41, 42, 43, 44; 325/42, 41, 38 R, 38 A; 328/162, 165; 340/347

[56] References Cited

U.S. PATENT DOCUMENTS

| | | | |
|---|---|---|---|
| 3,187,260 | 6/1965 | Dove | 178/68 X |
| 3,226,685 | 12/1965 | Potter et al. | 360/40 |
| 3,465,101 | 9/1969 | Christian et al. | 178/68 |

*Primary Examiner*—Benedict V. Safourek
*Attorney, Agent, or Firm*—Robert G. Clay; Ralph L. Mossino

[57] ABSTRACT

Apparatus is disclosed for transmitting through a transmission channel a digital data stream of the type where the position of a level transition within a bit cell determines the information content of the bit cell. As the data stream is transmitted through the transmission channel, degradation of the transitions can occur due to differing response characteristics with respect to level transitions in opposite directions. A pulse for each level transition of the data stream is generated, the pulses converted to a pair of complementary level pulses for transmission, a single level pulse is produced from the transmitted complementary level pulses when the instantaneous level of both said complementary pulses are the same during a transition and thereafter an output signal is provided having a level transition for each pulse.

7 Claims, 20 Drawing Figures

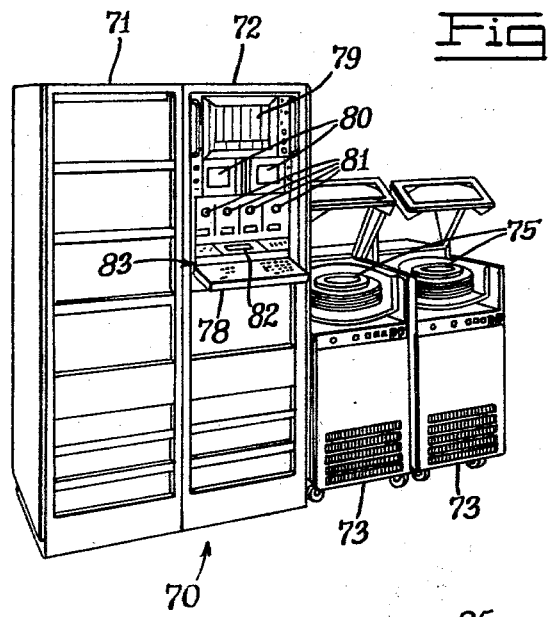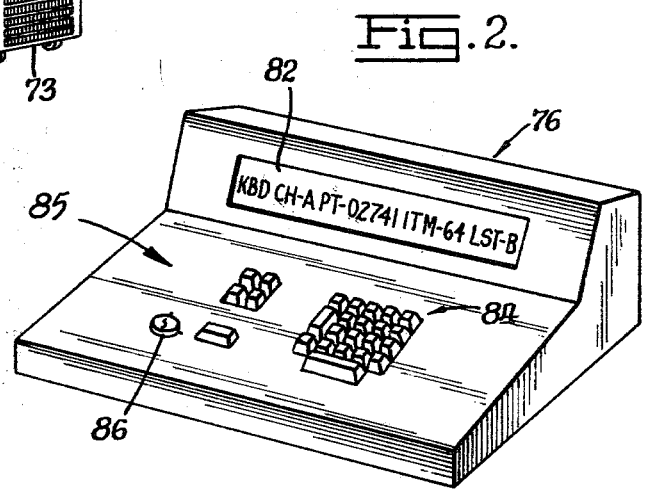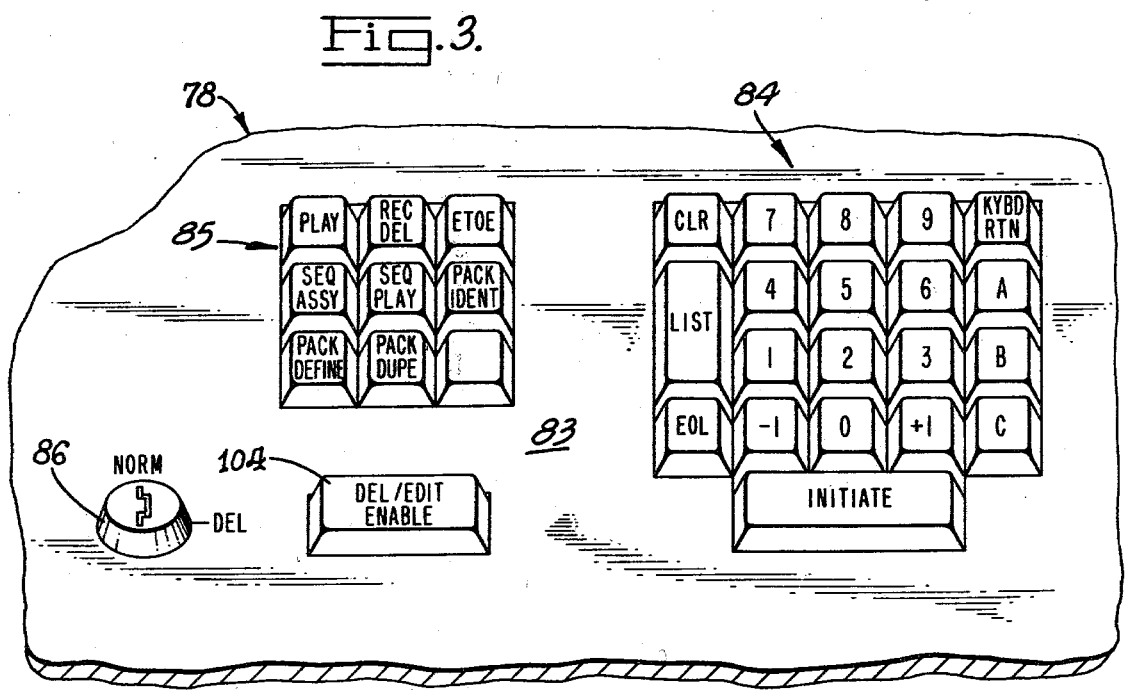

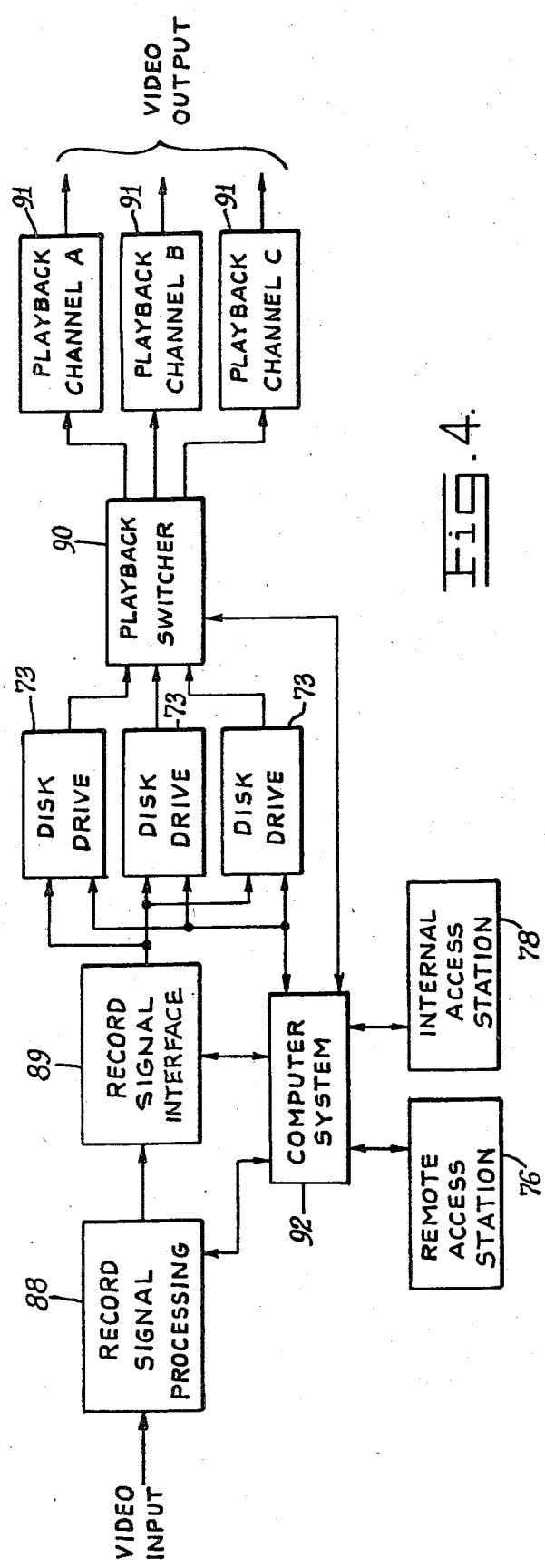
Fig. 4.
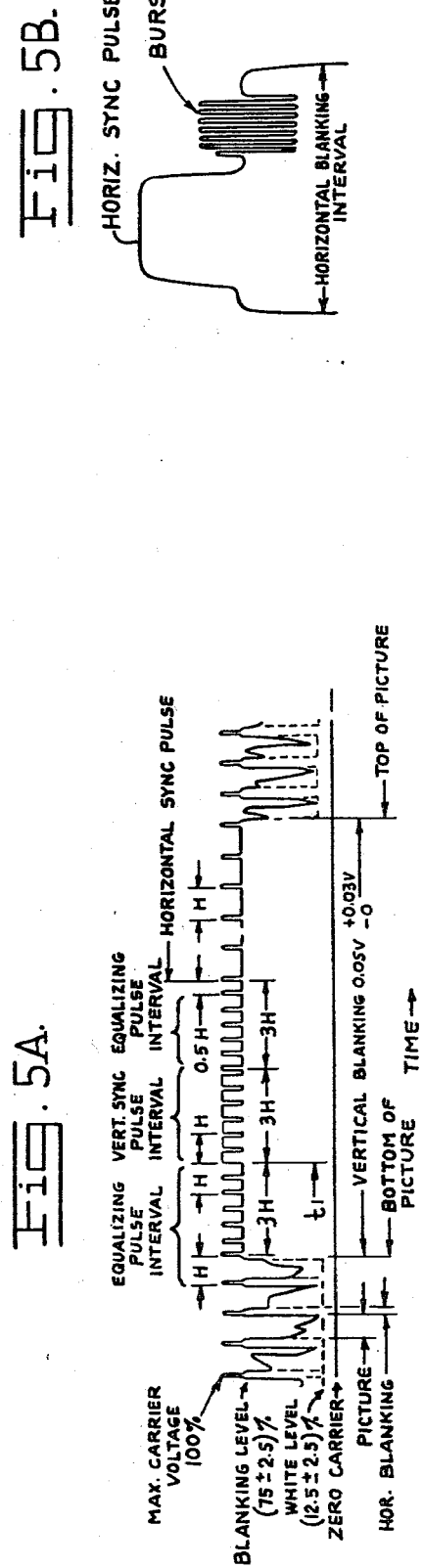
Fig. 5A.
Fig. 5B.

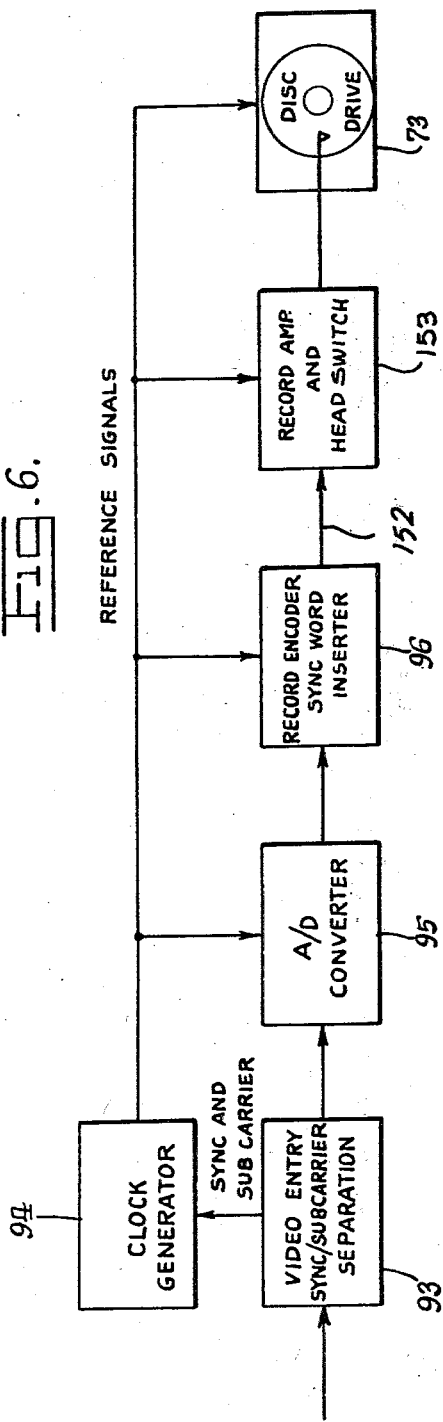
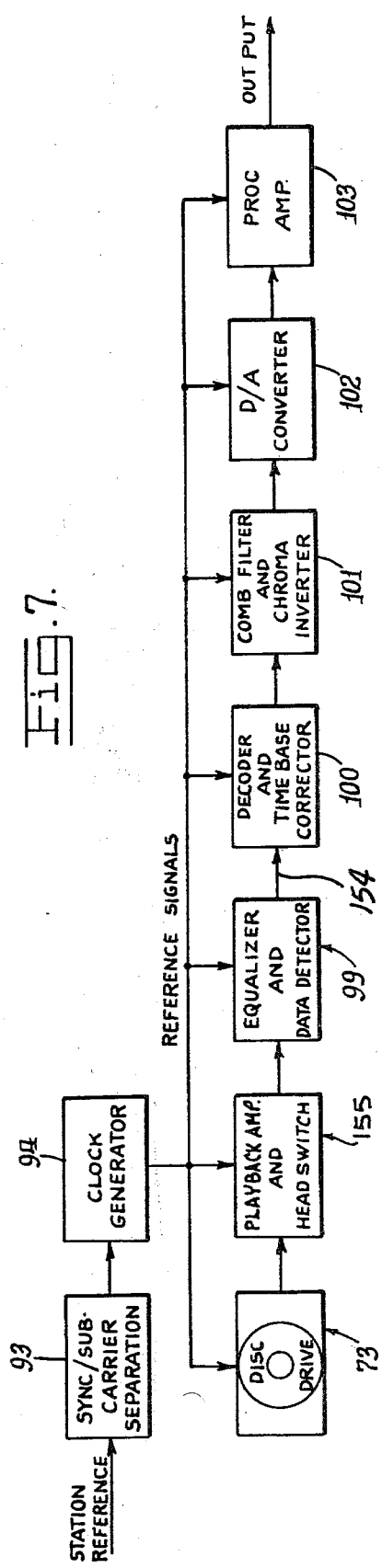

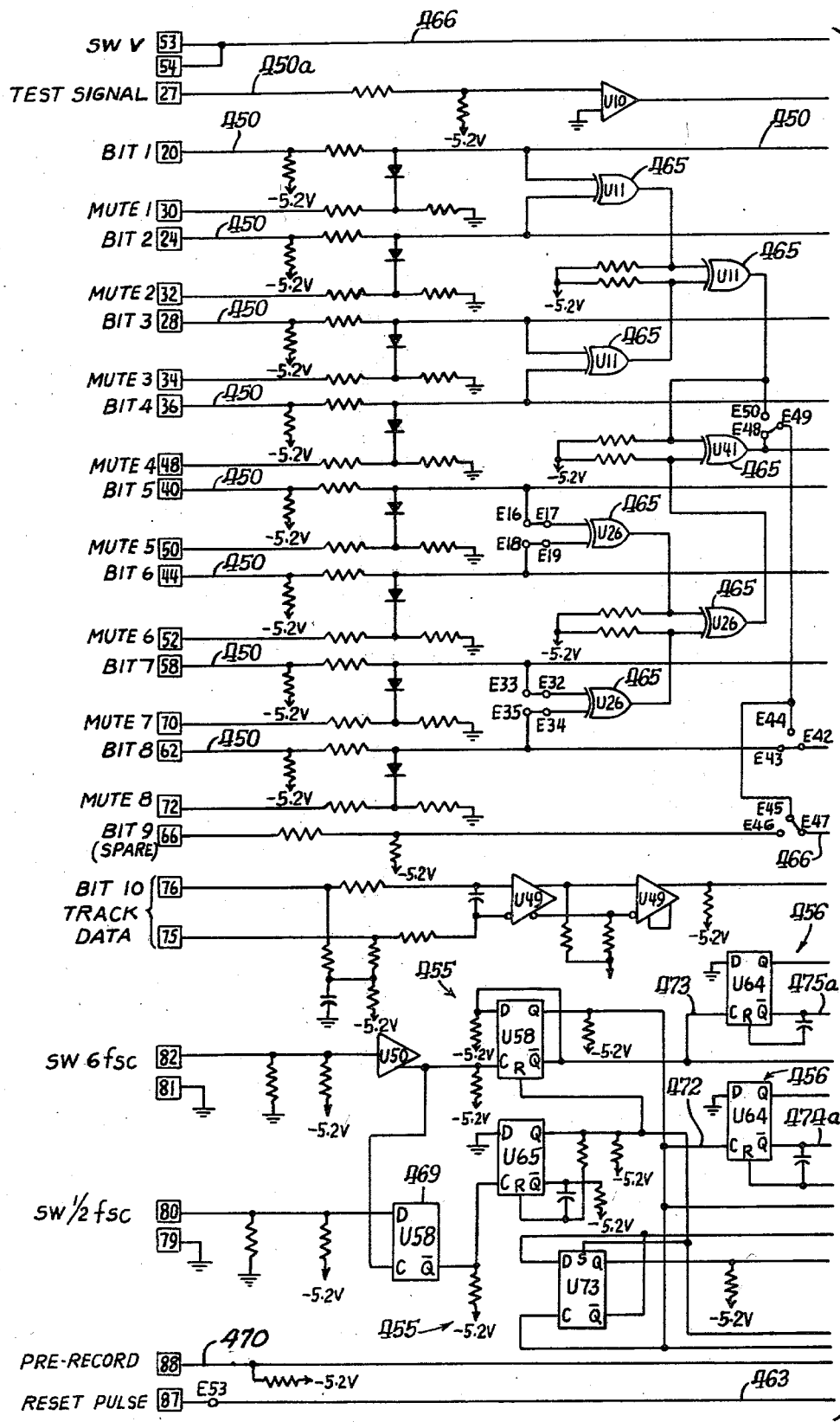

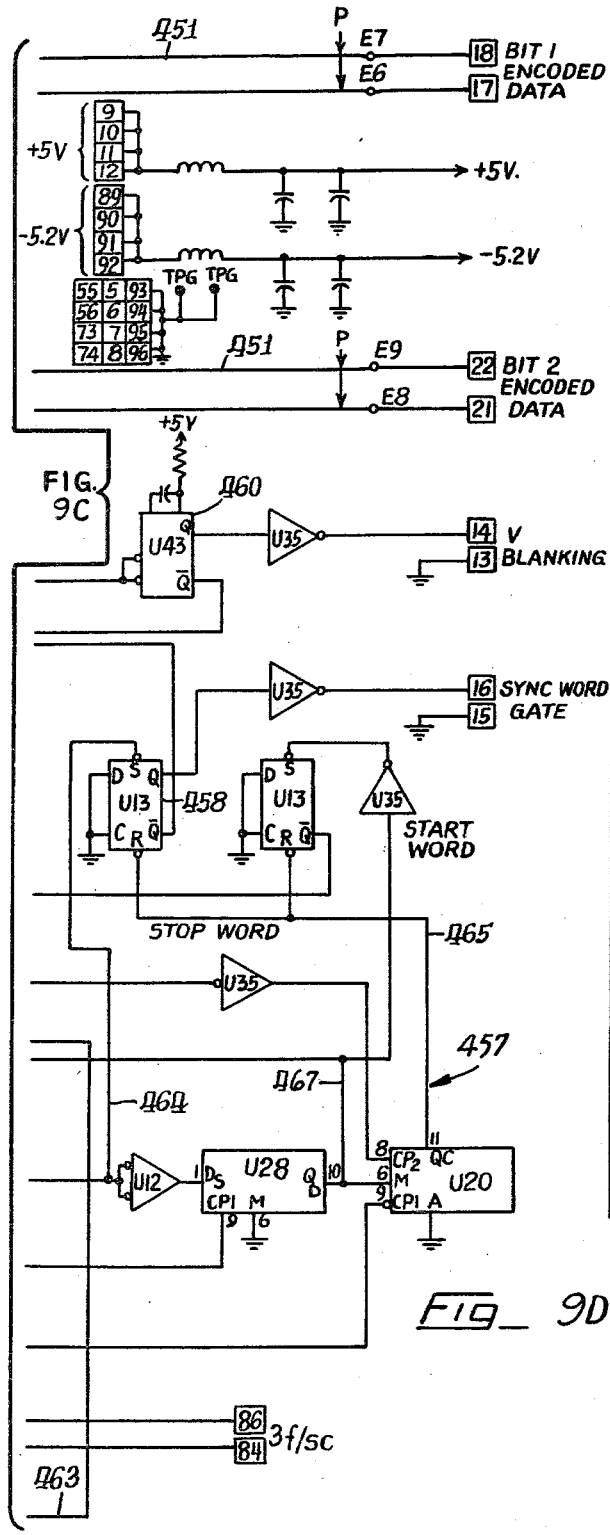

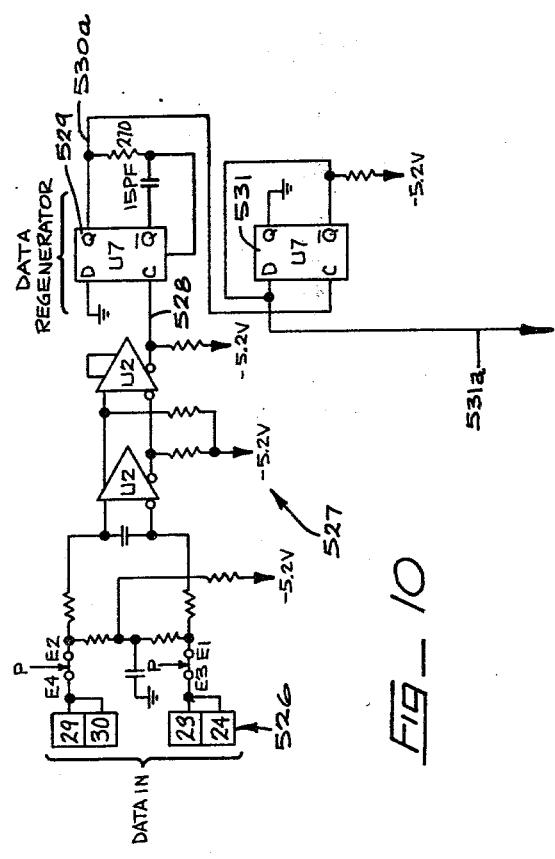

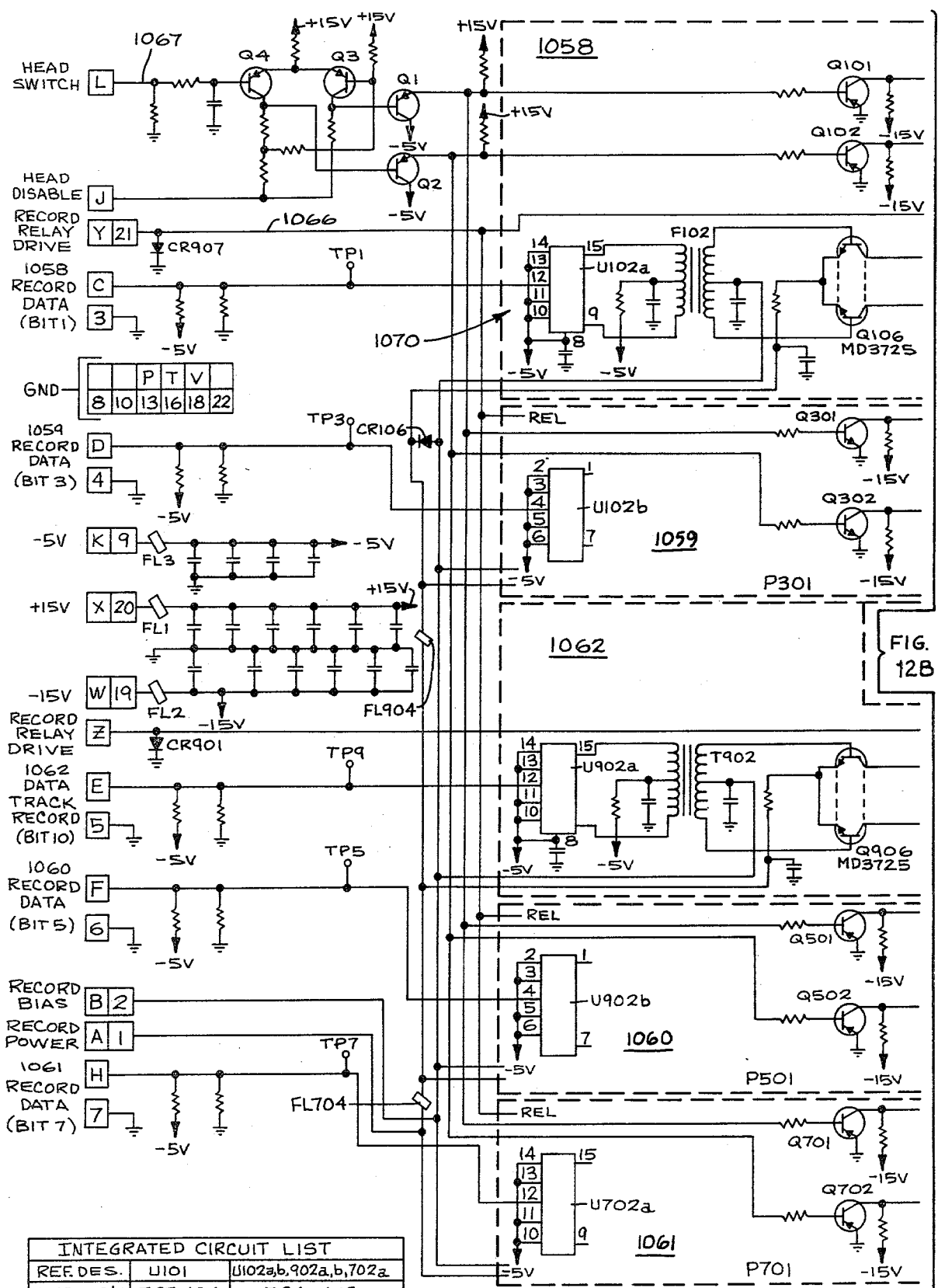
FIG_12A

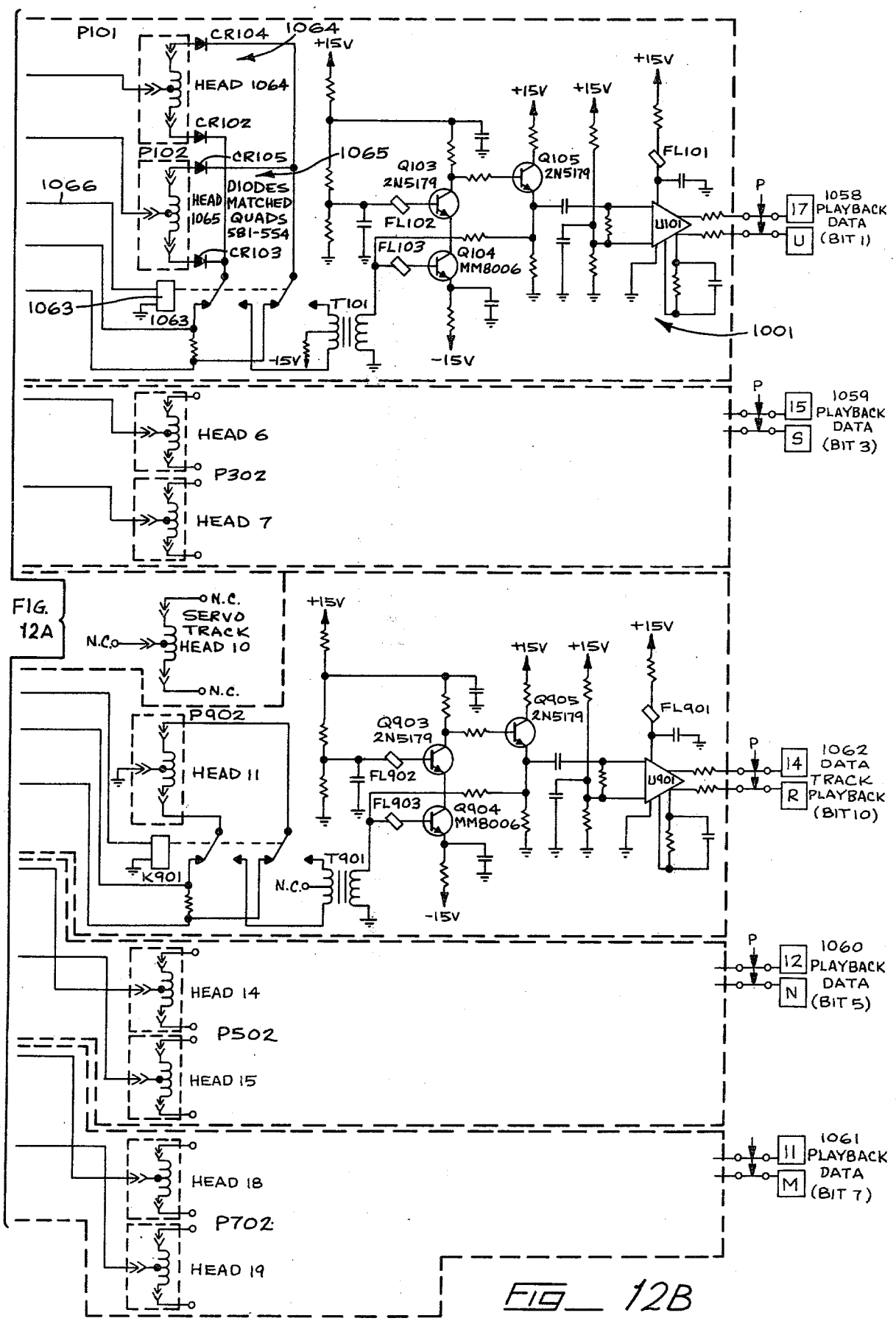

HIGH BIT RATE DIGITAL DATA SIGNAL TRANSMISSION SYSTEM

CROSS REFERENCE TO RELATED APPLICATIONS

VIDEO FRAME STORAGE RECORDING AND REPRODUCING APPARATUS, Ser. No. 763,371, filed Jan. 28, 1977, by Joachim P. Diermann and Thomas W. Ritchey, Jr.

PLAYBACK APPARATUS ASSIGNMENT MEANS, Ser. No. 763,462, filed Jan. 28, 1977, by Howard W. Knight and Edwin W. Engberg, now abandoned.

TELEVISION SIGNAL DISC DRIVE RECORDER, Ser. No. 763,795, filed Jan. 28, 1977, by Howard W. Knight and Edwin W. Engberg.

DISC DRIVE RECORDING PROTECTION APPARATUS, Ser. No. 763,761, filed Jan. 28, 1977, by Edwin W. Engberg.

TELEVISION SUBCARRIER PHASE CORRECTION FOR COLOR FIELD SEQUENCING, Ser. No. 763,942, filed Jan. 28, 1977 by Luigi C. Gallo.

METHOD AND APPARATUS FOR PROVIDING DC RESTORATION Ser. No. 763,461, filed Jan. 28, 1977, by Luigi C. Gallo.

METHOD AND APPARATUS FOR INSERTING SYNCHRONIZING WORDS IN DIGITIZED TELEVISION SIGNAL DATA STREAM, Ser. No. 763,463, filed Jan. 28, 1977, by Luigi C. Gallo.

PRECISION PHASE CONTROLLED CLOCK FOR SAMPLING TELEVISION SIGNALS, Ser. No. 763,453, filed Jan. 28, 1977, by Daniel A. Beaulier, Luigi C. Gallo.

DIGITAL TELEVISION SIGNAL PROCESSING SYSTEM, Ser. No. 763,941, filed Jan. 28, 1977, by Luigi C. Gallo.

CLOCK SIGNAL GENERATOR PROVIDING NONSYMMETRICAL ALTERNATING PHASE INTERVALS, Ser. No. 763,792, filed Jan. 28, 1977, by Daniel A. Beaulier and Luigi C. Gallo.

PHASE LOCK LOOP FOR DATA DECODER CLOCK GENERATOR, Ser. No. 763,793, filed Jan. 28, 1977, by Kenneth Louth and Luigi C. Gallo.

A CIRCUIT FOR DIGITALLY ENCODING AN ANALOG TELEVISION SIGNAL, Ser. No. 762,901, filed Jan. 26, 1977, by Daniel A. Beaulier.

DATA RATE AND TIME BASE CORRECTOR, Ser. No. 763,794, filed Jan. 28, 1977, by Luigi C. Gallo, now abandoned.

A DIGITAL CHROMINANCE SEPARATING AND PROCESSING SYSTEM AND METHOD, Ser. No. 763,251, filed Jan. 26, 1977, by Robert P. MacKenzie, abandoned in favor of continuation application, Ser. No. 765,563, filed Feb. 4, 1977.

FREQUENCY RESPONSE EQUALIZER, Ser. No. 762,902, filed Jan. 26, 1977, by Jerry W. Miller and Luigi C. Gallo.

A CIRCUIT FOR GENERATING A DIGITAL DELETED DATA, BLINKING CROSS SIGNAL WHICH IS STORED IN A DELETED TRACK AND SELECTIVELY DISPLAYED FOR DETECTION, Ser. No. 762,903, filed Jan. 26, 1977, by Luigi C. Gallo and Junaid Sheikh, abandoned in favor of continuation application, Ser. No. 765,564, filed Feb. 4, 1977.

BACKGROUND AND FIELD OF THE INVENTION

The present invention generally relates to data transmission apparatus and, more particularly, to apparatus that is adapted to transmit pulse representations of high bit rate digital data.

The continued advances in technology have resulted in many changes in the equipment that is currently being used in television broadcast stations. One of the more recent changes that has evolved is the shift away from photographic techniques toward the use of magnetic media in many phases of the operation of the commercial broadcast television station. For example, feature films being broadcast often originate from magnetic tape rather than film and television station news departments are increasingly converting to videotape recording systems rather than using film cameras to provide the visual coverage of the news stories. Moreover, many systems utilize travelling transmitters that can either broadcast on location coverage or transmit such coverage to the station which can either be broadcast "live" or videotaped, edited and broadcast at a later time. Some of the many benefits of these techniques are the ease of handling, flexibility and speed of processing compared to the use of photographic film, coupled with the ability to reuse the magnetic tape when the information that is recorded on them is no longer needed.

One of the last remaining film domains in the present day commercial television broadcasting station is the Telecine island which uses 35 millimeter film transparencies. The Telecine island is used to provide video still images that are used during programming, commercials, news and the like, i.e., wherever a still image may be used during operation. Their use is extensive as is evidenced by the fact that the average commercial broadcast television station maintains a total file on the order of about 2000 to 5000 35 millimeter transparency slides. The maintenance of the total file represents a laborious operation which requires introduction of new slides, the discarding of obsolete slides and the maintenance of an accurate index so that they can be readily obtained when needed. When slide program sequences are to be assembled, they must be manually carried to the Telecine island, cleaned and manually loaded. Even with the cleaning operation, dust particles and scratches and the like may easily result in an unsatisfactory end product even when the projectionist is careful. Moreover, following their use during broadcasting, the slides must be removed and returned to the file. The entire assembling, use and refiling of the slides represents a substantial labor investment because of the many manual operations that are required. The Telecine operation is considered to be one of the most antiquated operations in many modern broadcast stations and is basically incompatible with a fully automated station operation.

In contrast to the Telecine island or the use of opaque graphic material as the source for generating video still images, the present invention facilitates the use of a recording and playback apparatus that will record and reproduce still images, with the still image video information being stored on magnetic media. The apparatus of the present invention facilitates the transmission of digital data between distant points and, hence, the use of standard computer disc drives (though modified in some respects) as the magnetic storage media for digitized video images and thereby eliminates the many problems that are associated with slide transparencies.

Since the still images are recorded on magnetic media, the problems of physical degradation during use, e.g., dust particles and scratches, are not experienced. Moreover, since the recorded information can be easily accessed, the same still image may be used by operators at different locations almost simultaneously.

In the digital data transmission system of the present invention, each level transition is converted to a pulse signal having an edge extending in a selected direction between signal levels precisely defined with respect to the level transition. Following transmission to a receiving device, each pulse signal is converted to a level transition, which level transition is synchronized to the selected direction pulse signal edge reaching a selected magnitude. For transmission lines of the kind using a plurality of individual lines to transmit a data signal, such as a twisted pair transmission line, each pulse signal includes a pair of coincident pulses representing each level transition of the digital data stream, with a coincident edge of the pair of coincident pulses synchronized to the represented level transition. Using such pulse signals to transmit information determining level transitions of digital data streams minimizes timing distortions typically introduced into digital data streams by non-linear transmission channels that alter oppositely directed (i.e., line charging and line discharging) signal level transitions in different, non-linear manners with respect to time.

While the digital data transmission system of the present invention is suited for use in apparatus for recording and reproducing still images and a preferred embodiment is described herein as arranged for such operations, the transmission system can be arranged for use with other apparatus in which digital data is transmitted between distant points, including apparatus used to record and reproduce a sequence of images depicting motion with both altered and unaltered time base effects.

OBJECT OF THE INVENTION

Accordingly, it is an object of the present invention to provide an improved digital data transmission system that is particularly adapted to the transmission of digital data streams in which transitions between signal levels determine the data content.

It is another object of the present invention to provide such a digital data transmission system that is particularly adaptable for use in transmitting digital data streams of the kind in which the position of a signal level transition within a data cell interval determines the content of the digital data stream.

Another object of the present invention is to provide a digital data transmission system of the foregoing type which facilitates the transmission digital data between distant points with minimum timing distortion.

Other objects and advantages will become apparent upon reading the following detailed description in conjunction with the attached drawings.

DESCRIPTION OF THE DRAWINGS

FIG. 1 is a perspective view of the apparatus embodying the present invention, illustrating its overall appearance, including the internal access station and two disc drive units;

FIG. 2 is an enlarged perspective view illustrating a representative remote access station that an operator can use to control the operation of the apparatus of the present invention;

FIG. 3 is an enlarged top view of a portion of the internal access station keyboard shown in FIG. 1 particularly illustrating the various keys and bars that an operator uses during operation;

FIG. 4 is a broad functional and simplified block diagram of the entire apparatus of the present invention;

FIG. 5A illustrates a portion of a typical television signal illustrating the vertical interval thereof;

FIG. 5B illustrates a portion of a color television signal, particularly illustrating the horizontal synchronization pulse and color burst signal;

FIG. 6 is a functional block diagram broadly illustrating the signal flow path through the apparatus during a record operation;

FIG. 7 is a functional block diagram broadly illustrating the signal flow path through the apparatus during a playback operation;

FIGS. 9A, 9B, 9C and 9D together comprise an electrical schematic diagram of the encoder and sync word inserter circuitry of the signal system shown in the block diagram of FIG. 8;

FIG. 9E is a timing diagram illustrating the operation of the data encoder circuitry shown in FIGS. 9A, 9B, 9C and 9D;

FIG. 10 is an electrical schematic diagram of the input portion of the data decoder circuitry of the playback signal system shown in the block diagram of FIG. 7;

FIGS. 12A and 12B together comprise an electrical schematic diagram of the preamplifier circuits employed in the playback circuit.

Referring to FIGS. 1-3, a recording and reproducing apparatus is illustrated, indicated generally at 70 in FIG. 1 which includes two bays 71 and 72 containing electrical circuitry associated with the apparatus, together with the various monitoring and control hardware shown specifically in the upper portion of the bay 72. The system also includes a pair of disc drives 73 located adjacent the rightward bay 72 with each of the disc drives 73 having a disc pack 75 mounted thereon. While two disc drive units are specifically illustrated in FIG. 1, it should be understood that there may be additional disc drives used with the system to increase the on-line storage capacity of the apparatus. It should also be appreciated that a single disc drive may be used. Operational control of the apparatus is performed by one or more operators using either one of many remote access stations, such as the remote access station 76 shown in FIG. 2, or an internal access station 78 which is located in the bay 72. If desired, a video monitor 79, vector and "A" oscilloscopes 80 may be provided as shown in bay 72. Phase control switches 81 are provided above the internal access station 78.

Figure 8:
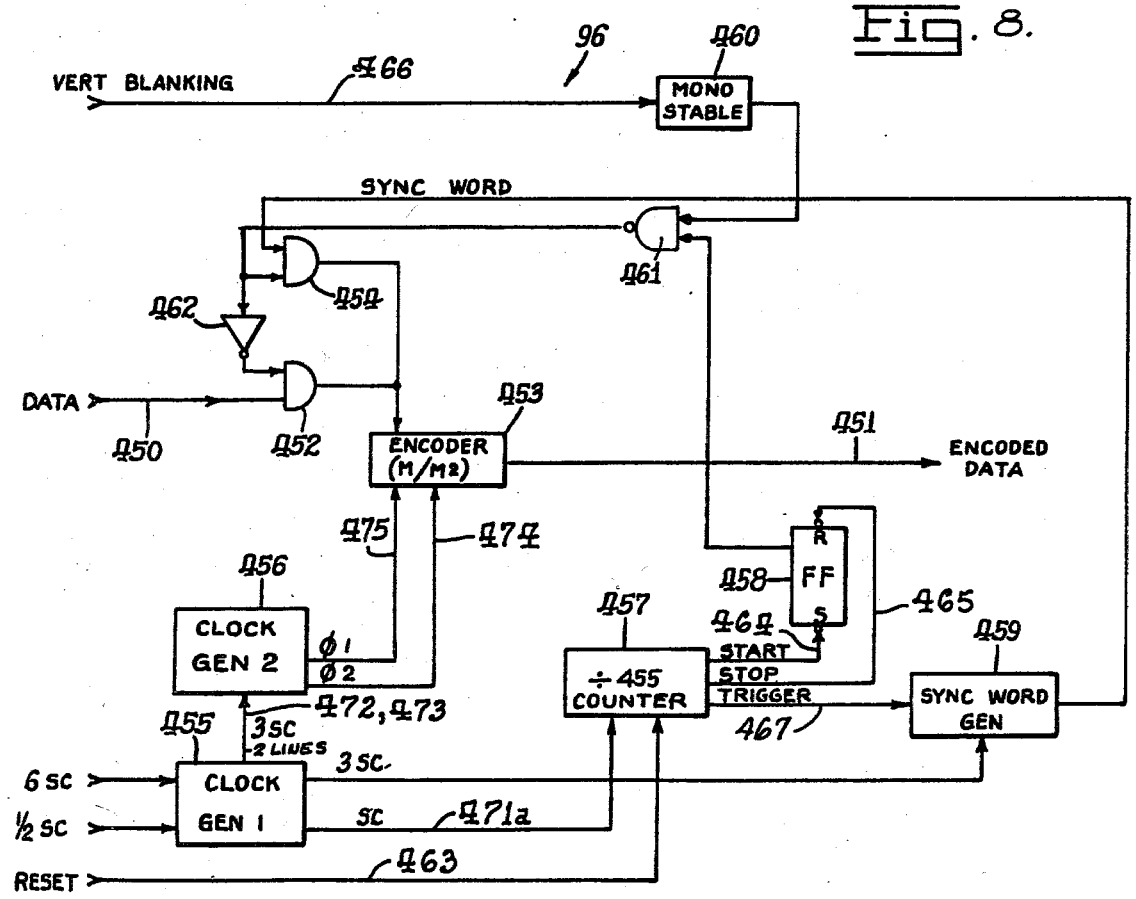
FIG. 8 is a functional block diagram of the encoder and sync word insertion circuitry.

The apparatus is controlled by an operator using either the internal access station 78 or a remote access station 76, both types of which have a keyboard with numerical and function keys and bars, a 32 character display 82, which provides a readout of information that is needed to carry out functional operations during use, as well as to display the information concerning the identity of certain stills being addressed and other information. It should be understood that the remote access station 76 shown in FIG. 2 is representative of each of the remote access stations and, up to seven remote access stations can be used to control the apparatus 70. The internal access station keyboard indicated generally at 83 in FIG. 1, as shown in the enlarged fragmentary view in FIG. 3, has more expanded operational capability than the remote access stations, whose keyboards have fewer function keys. The keyboard contains a large cluster of keys indicated generally at 84 and a smaller cluster of function keys 85 located on the left side of the keyboard. Additionally, a turn key controlled switch 86 may be provided to switch between normal and delete operations to safeguard against the possibility of inadvertent or unauthorized erasure of actively used stills.

Referring to the very simplified block diagram shown in FIG. 4, the apparatus receives a video input signal which is processed by record signal processing circuitry 88 and is then applied to record signal interface circuitry 89 which directs the signal to all of the disc drives 73. Gating circuitry located within a selected disc drive 73 is enabled to allow the signal to be recorded on a selected drive. More than one disc drive 73 can be simultaneously selected for recording the video signal provided by the record signal interface circuitry 89. Switcher circuitry can be substituted for the signal interface and associated gate circuitry so that the signal provided by the record signal processing circuitry 88 is coupled only to selected disc drives having the disc packs 75 upon which the signal is to be recorded. During playback, a signal originating from one of the disc drives is applied to the playback switching circuitry 90 which directs it to one of the playback channels 91, each of which provides a video output channel. A computer control system 92 is interfaced with the record processing circuitry, signal interfacing and switching circuitry and disc drives for controlling the overall operation of the various components of the apparatus and also interfaces the remote access stations and internal access station. The circuit details of the computer control system 92 and of the access stations 76 and 78 for controlling the recording and reproducing apparatus 70 are described in the above-identified related application, Serial No. 763,371. An operator can select a particular disc in which to store a still, provided that the disc pack is online, i.e., it is physically loaded on one of the disc drives 73. In this regard, it should be understood that the apparatus addresses disc packs rather than disc drives for the reason that the apparatus is adapted to identify up to 64 separate disc packs, only one of which can be located on a driveway at any one time. Thus, in the event the apparatus has two disc drives, only two disc packs can be online at one time. The operator can use an access station keyboard 83 to enter the address of a disc pack upon which he wishes to record a still and, through the interaction of the computer with the disc drive on which the selected disc pack is loaded, can carry out the recording operation on the selected on-line disc pack. Similarly, an operator can play back a still frame from the disc pack on one of the disc drives and can define the playback channel that he wishes the still frame to be played through.

The apparatus has four major operating modes or conditions, i.e., (1) record/delete, (2) playback or reproduce, (3) sequence assembly and (4) sequence play. The record and play operations will be initially described, while referring to FIGS. 6 and 7 which illustrate somewhat simplified block diagrams of the signal flow paths during recording and playback, respectively, with respect to one of the disc drives 73.

Turning first to the record signal flow block diagram of FIG. 6, the composite video input signal is applied to the input stage circuitry 93 where clamping of the signal takes place and the synchronization and subcarrier components are stripped from the composite video signal. The composite video signal of an NTSC system is illustrated in FIGS. 5A and 5B. The input stage also regenerates the synchronization (hereafter often referred to merely as "sync") and subcarrier signals for later use during reproduction and, accordingly, the regenerated sync and subcarrier signals are directed to a clock generator 94 which also generates reference signals that are used by the downstream elements during operation. The clamped analog video signal with the color burst component is then applied to an analog-to-digital converter (A/D) 95 which provides an output signal at a sample rate of 10.7 megasamples per second, with each of the samples comprising 8 bits of information. The digital video signal is a nonreturn to zero code (NRZ) which means that it is a binary code defining a ONE as a high level and a ZERO as an equivalent low level. A signal level transition occurs between the low and high levels when different digital data bits occur in successive data cell intervals. The digitized video signal appears on 8 parallel lines, i.e., one bit per line, which is applied to an encoder and sync word inserter 96 which converts the digitized video into a special recording code (referred to herein as a Miller code or a Miller squared code) that is particularly suitable for digital magnetic recording in that it minimizes DC content of a data stream. The circuitry also inserts a synchronizing word on alternate television lines with respect to a particular phase angle of the color subcarrier as repesented by the color burst sync component. The sync word is used as a reference for correcting time base and skewing errors that occur during playback among the eight parallel bits of data that must be combined to define the value represented by each sample. The digital video information in the eight parallel lines is then applied to a recording amplifier circuitry and head switch circuitry 153 associated with the selected disc drive 73 which switches between two groups of eight recording heads for recording the digitized video signal by the disc drive. The disc drive is servo controlled so that its spindle rotational speed is locked to vertical sync, with the rotational disc speed being 3600 revolutions per minute. By locking the spindle drive to vertical sync, the apparatus records one television field per revolution of the disc pack and simultaneously records the eight data streams on eight disc surfaces. At the completion of recording one field, the recording amplifier circuitry and head switch circuitry 153 is commanded to activate another set of heads for simultaneously recording the second field of a television frame on another set of eight disc surfaces so that a picture frame, i.e., two interlaced television fields is recorded on two revolutions of the disc drive, using 16 heads. Each disc pack located on a disc drive preferably contains 815 cylinders, each of which has 19 recording surfaces and can therefore store 815 digital television frames. There is one read/write head for each of the 19 disc recording surfaces of a disc pack and all heads are mounted vertically aligned on a common carriage whose position is controlled by a linear motor. It should be understood that a cylinder is defined to comprise all recording surfaces that are located on the same radius of a disc pack. However, the term track, rather than cylinder, is preferred herein and, accordingly, a track is meant to include all recording surfaces on a same radius, i.e., all surfaces on a cylinder. Thus, an addressed track for recording or playing back a still actually refers to the 19 individual surfaces on the cylinder available at that radius. Of the 19 surfaces that are available for recording, one is used to record the address and other housekeeping information, rather than active video information, and it is specifically referred to as the "data track". Two of the 19 surfaces are available for recording a parity bit and 16 surfaces are used to record the picture frame of video data. Also one of the heads, generally referred to as the servo head, travels on the 20th disc pack surface that contains only servo track information prerecorded by the pack manufacturer. The servo tracks carry out two functions, i.e., following a seek command the head stack traverses servo tracks that are counted to determine the instantaneous location of the heads and, after completion of a seek phase, the servo head generates an error signal that is used to control the linear motor position to hold the head carriage centered on the appropriate servo track. By using such a feedback system, it is possible to achieve a radial packing density of about 400 tracks per inch or a total of 815 tracks per disc pack.

Since the present apparatus does not record analog video signals because of frequency response limitations of disc pack memories, the video signal is digitized for recording. Because the digitized signal is recorded, the video signal to noise ratio of the system is primarily determined by quantization noise rather than recording media and preamplifier noise as is the case with conventional videotape recorders. Thus, the present apparatus delivers a signal to noise ratio of about 58 dB and effects such as moire and residual time base error do not exist, the digital random error of the storage channels being typically low enough to make occasional transmission errors virtually invisible.

By recording a digital data stream at a rate of 10.7 megabits per second on each of the eight disc surfaces, the linear packing density of the apparatus is about 6000 bits per inch which is about 60% greater than is used in conventional disc drive usage in data processing. The circuit details of the record circuitry and the disc drive control circuitry for record operations are described in the above-identified related application, Ser. No. 763,371.

During playback and referring to FIG. 7, the heads read, i.e., reproduce the digital video information from the eight surfaces per field and obtain the recorded channel encoded digital video signal from the two fields forming each picture frame. The reproduced signal is applied to a playback amplifier circuitry and head switch circuitry 155 associated with the selected disc drive 73 which amplifies the data streams of digital video information carried by the eight data bit lines and applies the same to equalizer and data detector circuits 99. The equalizer compensates for phase and amplitude distortion introduced to the signal by the band limiting effects of the record and reproduce processes and insures that the zero crossings of the reproduced signal are distinct and accurately positioned. Following equalization, the channel encoded signals in each data bit line are processed as described hereinbelow for transmission to the playback circuitry of the signal system over a twisted pair line. In accordance with the present invention, the processed channel encoded signals are in the form of a pulse for each zero crossing or signal state transition of the channel encoded signal. The twisted pair lines for the eight data bits of the digital video information apply the processed channel encoded signals to the decoder and time base corrector circuitry 100 of one or more of the playback channels 91 of the apparatus. The decoder and time base corrector circuitry 100 reprocesses the received signals to place them in the channel encoded format, decodes the signal to the non-return to zero digital form and time base corrects the digital signal with respect to station reference to remove inter-data bit line time displacement errors (commonly referred to as skew errors) and timing distortion within each of the data streams carried by the data bit lines. Thus, the time base corrector portion of the circuitry 100 serves to align the eight bits defining a single sample and remove timing distortion in each of the data bit lines relative to station reference. It should be realized that each playback channel 91 is provided with decoder and time base corrector circuitry 100 and within each playback channel each of the eight data bit streams travels through a separate decoder and time base corrector. The output of the circuitry 100 is then applied to a comb filter and chroma inverter circuitry 101 which separates the chroma information and selectively inverts and recombines the signal for reconstruction of a four field NTSC sequence. This reconstructed digital signal is applied to a digital-to-analog converter 102 which provides an analog video signal. The new sync and burst are then added by a process amplifier 103 to produce a composite video analog output signal of the playback channel 91 as is desired. The circuit details of the playback circuitry and the disc drive control circuitry for playback operations are described in the above-identified related application, Ser. No. 763,371.

A digital data channel encoder 96 contains circuitry which performs functions in addition to channel encoding the digitized data on each of the eight video data bit lines, the parity bit and the data track sequence as described hereinbelow. One of the additional functions involves the use of a parity generator to perform a parity check to verify that the data is correct on all of the eight data bit lines. The parity bit is optional and requires an extra data bit line such as is available in the apparatus described herein. The encoder 96 also generates and inserts the sync word (also referred to herein as the line identification or line ID). The sync word is in the form of a 7-digit binary number which is placed in alternate television lines, generally where the horizontal sync pulse had been previously located, it being understood that the horizontal sync had been stripped from the composite video signal by the video input circuitry 93. The sync word is inserted within one cycle of SC of the location previously occupied by the horizontal sync pulse, and the encoder 96 inserts the sync word into each of the eight video data lines, the parity bit line and the data track line before the channel encoding is performed so that the output of the encoder 96 which is connected to the record signal splitter 89 contains the sync word in each of the 10 data streams recorded on a disc pack 75 (or sent to the playback channel 91 during E to E operations).

The encoder 96 operation will now be described in conjunction with a block diagram shown in FIG. 8 and schematic circuit diagrams of FIGS. 9A–D. NRZ-L data from the analog-to-digital converter 95 enters on input line 450 and exits on output line 451 of each data bit line after having been (i) checked for parity, (ii) had the sync word inserted in alternate (odd) lines and (iii) channel encoded in a format that is conducive to magnetic recording and reproducing the digitized information with respect to one of the disc packs 75. The input data on each data bit line is applied to one input of a data input AND gate 452 which is connected to a channel encoder 453, which may be switched between two channel encoding formats, both of which will be described hereinafter. In the schematic circuit diagram of FIGS. 9A-D, identical channel encoders for two video data bit lines are shown in their entirety. Identical channel encoders for the other video, parity and data track data lines are contained in dotted line enclosures below the encoders shown in their entirety. A sync word input AND gate 454 in each of the 10 bit lines is used to gate the sync word into the encoder at the proper time. These AND gates are also arranged to insert a test signal in the 10 bit lines if desired, the test signal being provided on line 450a (FIGS. 9A and 9B) by a suitable test signal source, such as digital test pattern generator. A first clock generator 455 has input reference clock signals 6SC and ½SC provided thereto by the clock generator 94 and provides various SC and 3SC outputs as shown. Two of the 3SC outputs are applied by lines 472 and 473 to a second clock generator 456 which provides two time displaced 3SC clock signals on the two lines 474 and 475 that are extended to the channel encoder 453 for clocking the same. The clock signal on line 475 is a $\phi 1$ clock and is displaced one-half cycle of 3SC from the clock signal on line 474, which is $\phi 2$ clock. During recording operations, these time displaced clocks are derived from the continuous phase 6SC, ½SC signals generated by the reference clock generator 94 and provided to the encoder 96. The $\phi 1$ and $\phi 2$ 3SC clock signals are used to drive the channel encoder 453 so that a continuous channel encoded digital signal without phase discontinuities is provided at the output on line 451.

The clock generator 455 has an SC clock output 471a driving a ÷455 divider 457 which can also be reset by a reset pulse provided by the reference clock generator 94 on line 463 at a 30 Hz rate. The divider 457 sets a flip-flop (FF) 458 through the start line 464 and subsequently resets the FF 458 when a pulse appears on the stop line 465 extending to the reset pin. The START and STOP pulses define a window during which a single 7-digit binary sync word provided at the output of a sync word generator 459 can be inserted in all data bit lines simultaneously.

During the vertical blanking period, a pulse is applied to a monostable multivibrator (MS) 460. The multivibrator is active for a period of about 10 lines of the vertical blanking period by switch vertical signal provided on line 466 by the reference clock generator 94 and its output is applied to one side of gate 461 (shown in this block to be a NAND gate), the other side of which is supplied by the output of the window generating FF 458. The output of the NAND gate 461 extends to the other input of the AND gate 454 as well as through an inverter 462 to one side of the AND gate 452.

During the operation of the encoder circuitry 96, it is desired that the data stream for each bit be applied on an input such as input 450 which is representative of the eight separate data input lines, each of which is connected to a separate encoder 453 and the associated data and sync word input AND gates 452, 454 and inverter 462 so that a data output line 451 exists for each of the data bits and each of the data streams is properly channel encoded and has a sync word inserted therein. Since it is desired that the sync word occur close to the former location of the horizontal sync pulse and since it is also desired that it not be confused with data of the data stream, the data bit lines input to the channel encoders 453 are disabled by the data input gates 452 when the sync word is inserted during a sync word gate window that is generated by the divider 457 and FF 458. More specifically, the divider 457 provides a START pulse for setting the FF 458 and this enables one input of each AND gate 454 while simultaneously disabling each AND gate 452 thereby blocking the data entering on lines 450. The divider 457 issues a pulse to the sync word generator 459 over line 467 twelve data bit intervals after the generation of the START pulse and the sync word generator 459 then generates the 7-digit binary word which is applied to the upper input of all AND gates 454 which have previously been enabled. The AND gates 454 pass the sync word into each channel encoder 453 where it is encoded onto the data stream. After the sync word has been generated, the divider 457 issues a STOP pulse 29 data bits later which resets the FF 458, disabling all AND gates 454 and simultaneously enabling all AND gates 452 so that the data on lines 450 will be passed into the channel encoders. It should be understood that the data stream line 450 is continuous in its flow and that disabling the AND gates 452 merely blocks it from passing. Hence, the information is only discarded in a sense during the insertion of the sync word. However, since the sync word is inserted approximately at the previous location of the horizontal sync pulse, no active video informational data is lost.

During the vertical blanking interval, the multivibrator 460 provides an output to the NAND gate 461 which occurs for an interval of about 10 lines. This disables the data input AND gate 452 during the 10-line interval of the blanking period so that the received data is prevented from passing to the channel encoder during this interval. Thus, the only data or logical 1 bits that appear on the output data line 451 during the 10 line interval of the vertical blanking period are those in the sync words that appear every other line, as previously described, and pass through the sync word gate 454. This insures that the decoder and time base corrector circuitry 100 will be locked on the actual sync word during playback rather than some randomly occurring sync word bit pattern that might be contained in the active video information during the flow of the data stream.

Another aspect of the operation of the encoder 96 will be more clearly understood by referring to FIGS. 4, 6 and 7. The record signal interface 89 and playback switcher 90 couple the encoder 96, disc drive 73 and decoder and time base corrector circuitry 100. It should be appreciated that during a seek operation when the heads in the disc drive 73 are moving between tracks, it is desirable to prevent the introduction of perturbances in the signal system. Ordinarily, the record signal processing system 88 will provide at the output of its encoder 96 digitized data even in the absence of an input video signal. While this signal will represent noise information, the digital signal processing electronics of the apparatus cannot distinguish between digitized noise and digitized video information. This factor is taken advantage of when the apparatus is performing a seek operation. During seek operation, the transducing heads create noise signals that do not conform to the channel encoded format of the digital data ordinarily present in the signal system. Such noise signals, if permitted to enter the playback channel 91, undesirably perturb the phase lock loops of the decoder and time base corrector circuitry 100. To avoid such perturbances, the record signal interface 89 and playback switcher 90 are switched (as in an E-to-E operation) to reroute the output provided by the encoder 96 to the decoder and time base corrector circuitry 100. In this manner, the decoder and time base corrector circuitry 100 is receiving channel encoded digital signals that maintain the respective phase lock loops in the circuitry 100 within their normal operation range. Hence, when the heads of the disc drive 73 are properly positioned and playback data provided to playback channel 91, the decoder and time base corrector circuitry 100 are prepared to immediately provide the output decoded and time base corrected signals.

In addition, the encoder 96 also serves to cause black level data to be generated for use in recording on the disc surfaces during the first two revolutions of the disc pack 75 prior to the recording of the video signal information on the subsequent two revolutions of the disc pack. Accordingly, the prerecord line 470 (FIG. 9A) is activated and causes NAND gate 461 to block any logical "1's" as may be present on the input lines 450 thereby producing the black level at the input of the channel encoder circuitry 453. It should be noted, however, that the encoder 96 still functions to insert the sync word in the black level signal.

The NRZ-L data in each data bit line 450 is channel encoded selectively by the channel encoder 453 into the DC free self clocking channel code described in the U.S. Pat. No. 4,027,335 or the self clocking channel code described in U.S. Pat. No. 3,108,261. As will be described further hereinbelow, the two position code selection switch 480 selects between the two channel codes. In both codes, the NRZ-L data bit stream on a data bit line is broken into discrete bit times commonly designated as data bit cell times. For the channel code described in the U.S. Pat. No. 3,108,261, the code rules followed result in logical first bits, e.g., logical 1's to be represented by signal transitions at a particular location in the respective bit cells, specifically at mid-cell, and logical second bits or logical 0's to be represented by signal transitions at a particular earlier location in the respective cells, specifically at the beginning or leading edge of each bit cell. Any transition occurring at the beginning of one bit interval following an interval containing a transition at its center is suppressed.

In the channel code described in the above-identified U.S. Pat. No. 4,027,335, the input data stream in each data bit line may be viewed as the concatenation of variable length sequences of three types: (a) sequences of the form 1111---111, any number of logical 1's but no logical 0's; (b) sequences of the form 0111---1110, any odd number of consecutive 1's or no 1's, with 0's in the first and last positions; (c) sequences of the form 0111---111, any even number of consecutive 1's preceded by a 0. A sequence is of type (c) only if the first bit of the next following sequence is a zero. Sequences of types (a) and (b) are encoded according to the code rules described in the U.S. Pat. No. 3,108,261. A sequence of type (c) is encoded according to the U.S. Pat. No. 3,108,261 rules for all bits except the last logical 1, and for this 1 the transition is simply suppressed. By this means, the type (c) sequence, viewed in isolation, is made to appear the same as a type (b) sequence, that is, the final logical 1 looks like a logical 0.

By definition, the type (c) sequence is followed immediately by a logical 0 at the beginning of the next sequence. No transition is allowed to separate the type (c) sequence from the following 0. Therefore, the special coding is distinctive for decoding purposes. The decoder must merely recognize that when a normally encoded logical 1 is followed by two bit intervals with no transitions, then a logical 1 and logical 0 should be output successively during those intervals. Other transition sequences are decoded as for the Miller code.

The encoding procedure for this code requires that a modulo-2 count be maintained of the number of logical 1's output by the encoder since the last previous 0 which was not the final bit of a type (b) sequence. If the count is 1 (odd number of 1's) and the next two bits to be encoded are 1 and 0 in that order, then no transitions are output during the next two bit intervals. If the next subsequent bit is another 0, then it is separated from its predecessor by a transition in the usual aforementioned U.S. Pat. No. 3,108,261 code fashion. This channel code provides for the transmission of data in binary form over an information channel such as a magnetic record/playback system, incapable of transmitting DC, the information being transmitted in self-clocking fashion.

With respect to the channel code, it makes no difference which binary state is considered logical 1 and which binary state is considered logical 0. In the foregoing and following descriptions the state normally marked by mid-cell transitions is considered the 1 state, whereas the state normally indicated by cell edge transitions is considered the 0 state.

The channel encoders 453 illustrated by the FIGS. 9A through 9D operate in accordance with the afore-described code rules. FIG. 9E is a timing diagram depicting the operation of the channel encoder 453 included in one of the data bit lines 450. With switch 480 shown in FIG. 9B in the indicated position, the channel encoders 453 provide encoded data in accordance with the code rules of the aforementioned U.S. Pat. No. 4,027,335. In its other position, the channel encoders 453 provide encoded data in accordance with the code rules aforementioned U.S. Pat. No. 3,108,261.

Figure 9B:
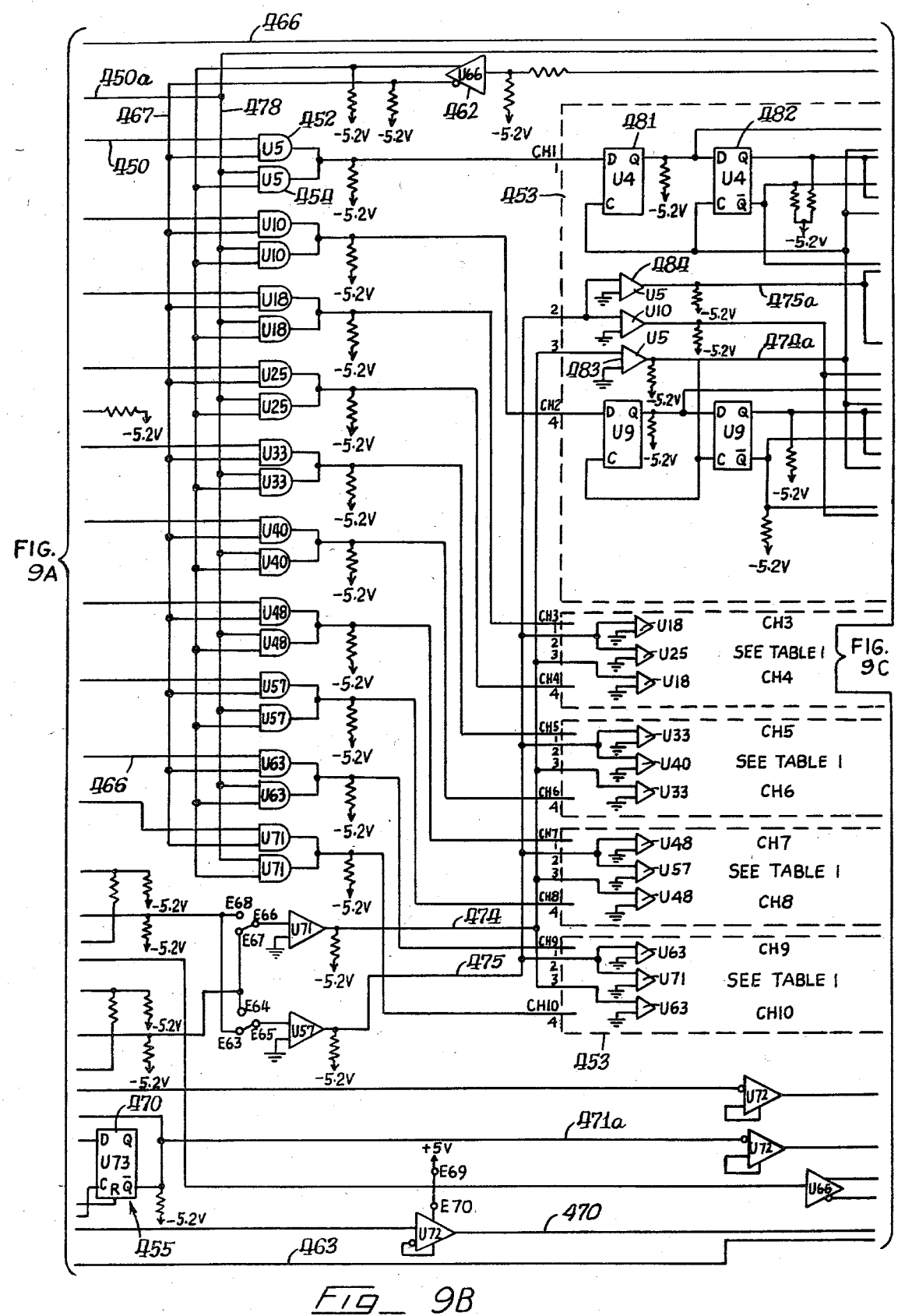

The channel encoder will now be described with the code selection switch 480 set as shown in FIG. 9B to effect channel encoding of one of data bit streams according to the code rules of the aforementioned U.S. Pat. No. 4,027,335. A description of the differences in the operation of the encoder when the switch 480 is set in its other position to effect channel encoding of the data bit stream according to the code rules of the aforementioned U.S. Pat. No. 3,108,261 will follow.

As described above, data encoded according to the U.S. Pat. No. 4,027,335 code rules requires examining two successive data bits to be encoded whenever the modulo-2 count of logical 1's previously encoded is odd. For this purpose, each channel encoder 453 includes a pair of serially connected input latches 481 and 482 clocked by the trailing positive edge of the $\phi 2$ 3SC clock signal (FIG. 9E-(2)) on line 474a, which is coupled to line 474 by an inverter 483. The input latches provide a two bit cell delay from the input of latch 481 to the output of latch 482. At each trailing positive edge of the $\phi 2$ clock, latch 481 is operated to latch the present data level of the bit stream at its input so that it appears at its output (FIG. 9E-(3)) and latch 482 is operated to latch the preceding data level of the bit stream contained in latch 481 so that it appears at its output (FIG. 9E-(2), (3) and (4)). Therefore, the outputs of the latches 481 and 482 contain the data bits of two consecutive bit cells that are to be encoded.

The outputs of the latches extend to the inputs of three NAND gates 486, 487 and 488 for separately gating through pulses corresponding to logical 1's and 0's in the data bit stream. NAND gate 486 receives three inputs; one from the output of latch 481, one from the output of latch 482 and $\phi$1 clock pulses (FIG. 9E-(1)) placed on line 475 by an inverter 484 connected to the output line 475a of the clock generator 456. This NAND gate is enabled to provide an output pulse 489 (FIG. 9E-(6)) upon receipt of a $\phi$1 clock whenever its other two inputs are at a low level, which occurs only when successively received data bits are logical 0's. Consequently, NAND gate 486 issues logical 0 related pulses that are marked by transitions in the channel encoded format of the data stream output by the channel encoder 453. A logical 0 bit that immediately follows a logical 1 bit is blocked from passage by the NAND gate because the latch 482 will be high when, for example, the $\phi$1 clock pulse 490 (FIG. 9E-(1)) occurs. Hence, the channel encoder 453 follows the code rules described in the aformentioned U.S. Pat. No. 3,108,261 for successively occurring logical 0 data bits.

On the other hand, the NAND gate 487 has two inputs and is enabled to provide an output pulse (FIG. 9E-(5)) upon receipt of a $\phi$1 clock for all logical 0 data bits. Because the output of latch 482 enables the NAND gate 487, the logical 0 related pulses are provided one data cell time after the data has been latched into the channel encoder 453.

NAND gate 488 has three inputs and is enabled by the inverted output of the latch 482 to provide an output pulse (FIG. 9E-(7)) upon receipt of a $\phi$2 clock for all logical 1 data bits, unless a high level bit suppression command 491 (FIG. 9E-(10)) is placed on the input of the NAND gate by a line 492 extending from a bit suppression NAND gate 493 as will be described hereinbelow. NAND gate 488 generates the logical 1 related pulses during the interval of the $\phi$2 clock, hence, before the latch 482 is clocked by the trailing positive edge of the $\phi$2 clock. The logical 1 related pulses are provided by the NAND gate 487 one data cell time after the data has been latched into the channel encoder 453 at latch 481.

Figure 9C:
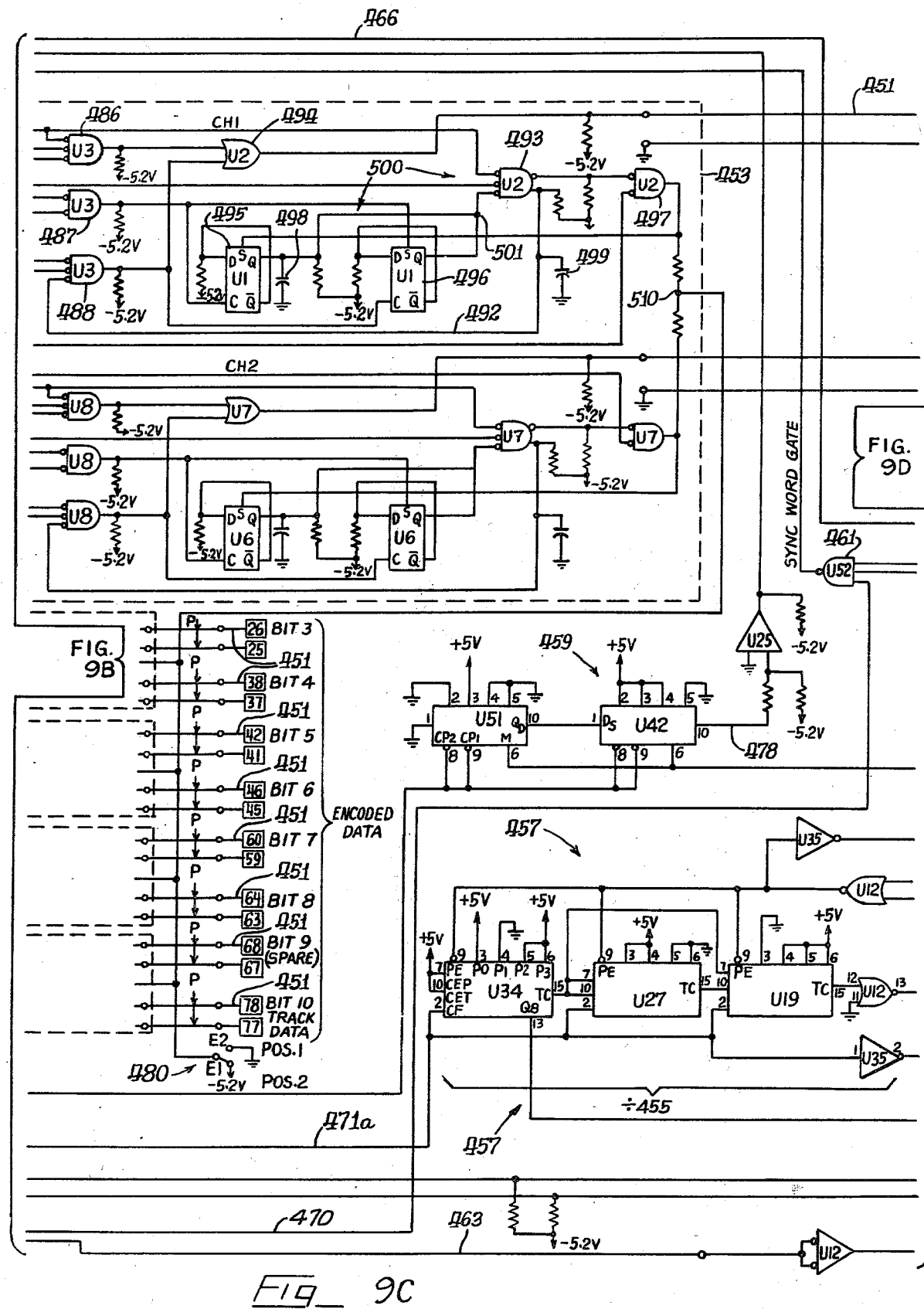

An OR gate 494 has two inputs connected to receive the logical 0 pulses 489 (FIG. 9-(6)) provided by NAND gate 486 according to the U.S. Pat. No. 3,108,261 code rules and the logical 1 pulses 515 (FIG. 9E-(7)) provided by the NAND gate 488. The output of the OR gate 494, which appears on the encoder output line 451, will, therefore, be a train of pulses (FIG. 9E-(14)) that occur according to the code rules for the channel encoder. Hence, the NAND gates 486 and 488 together with the OR gate 494 serve to encode the incoming NRZ-L data stored by the latches 481 and 482 into the selected channel code format. The NAND gate 487 operates with bit suppression logic circuitry 500 described below to control the selective suppression of logical 1 data bit related transition in the channel encoded data. By disabling the bit suppression logic circuitry 500, as would occur by changing the position of the switch 480 from that shown in FIG. 9C, the NAND gates 486 and 488 will encode the data according to the U.S. Pat. No. 3,108,261 rules.

To encode the data bit stream according to the aforementioned U.S. Pat. No. 4,027,335, the bit suppression logic circuitry 500 includes two modulo-2 counters 495 and 496 for counting encoded logical 1's and 0's and, together with cooperating gate circuitry, effecting the generation of the bit suppression command on line 492 that suppresses selective logical 1 bit related transitions in the channel encoded data appearing on line 451. The modulo-2 counter 495 counts the logical 0 related pulses coupled to its clock input by the NAND gate 487. Logical 1 related pulses provided by NAND gate 488 are coupled to the clock input for counting by the modulo-2 counter 496. Counter 495 recognizes the beginning of each sequence by toggling in response to logical 0 pulses each time a logical 0 is encoded and being cleared each time a logical 1 related transition is suppressed. As can be seen from the aforedescribed code rules, counter 495 toggles twice during a type (b) sequence and never changes state during a type (a) sequence, and therefore is in its cleared state before the start of any sequence. The bit suppression logic circuitry 500 must recognize the end of a type (c) sequence. Modulo-2 counter 496 is employed in the performance of this function by toggling in response to logical 1 pulses each time a logical 1 is encoded and being cleared in response to logical 0 pulses each time a logical 0 is encoded. Waveforms (8) and (9) of FIG. 9E illustrate the respective operations of the modulo-2 counters 495 and 496 if their outputs are not connected together at the wired-OR 501. Waveform (13) of FIG. 9E illustrates the actual state at the wire-ORed connection 501. As should be appreciated from the foregoing, if counter 496 is not in its cleared state, the counter 495 is in its cleared state, the present bit to be encoded is a logical 1 and the next following bit is a logical 0, the bit suppression command is provided by NAND gate 493 on line 492 to disable the NAND gate 488 and thereby suppress the encoding of the present logical 1 bit.

Considering the cooperating gate circuitry for controlling the clearing of the two modulo-2 counters 495 and 496, counter 496 has its set terminal coupled to the NAND gate 487 so that its output is set high each time a logical 0 related pulse is output by the NAND gate 487. The counter 495 has its set terminal coupled to the output of a NAND gate 497 so that it output is set high each time a logical 1 related transition is suppressed in the channel encoding of the data bit stream. For reasons that will become apparent from the following description, a pair of capacitors 498 and 499 are connected in the output circuits of the modulo-2 counter 495 and NAND gate 493, respectively, to delay the set logic level of counter 495 appearing at the wired-OR 501 and removal of the bit suppression command from NAND gate 488.

The bit suppression command is generated by the NAND gate 493 that examines the first of consecutive data bits to be encoded and which is present in inverted form at the output of the latch 482, the next following of the consecutive data bits to be encoded and which is present at the output of the latch 481 and the counter states of the modulo-2 counters 495 and 496. If either one of the counter outputs at the wire-OR 501 is high, the NAND gate is disabled. However, whenever the beginning of a type (c) sequence occurs, both counters 495 and 496 will be low, thereby placing an enabling signal at the input of the NAND gate 493. If the next two bits to be encoded are a logical 1 followed by a logical 0, the bit suppression command 491 will be generated and placed on line 492 upon the occurrence of the $\phi 2$ clock pulse 502 (FIG. 9E-(2)) immediately preceding the $\phi 1$ clock pulse 490 that would effect the generation of the logical 1 related pulse through NAND gate 493. Hence, when the $\phi 1$ clock pulse 490 (FIG. 9E (2)) occurs on line 474 that would cause the NAND gate 488 to generate a logical 1 bit pulse, the NAND gate 488 is disabled by the bit suppression command on line 492 and the logical 1 bit pulse is suppressed as represented by the pulses 512 shown in phantom at line (14) of FIG. 9E. The bit suppression command is terminated upon setting the counter 495. The set pulse 505 (FIG. 9E-(12)) is provided by the NAND gate 497 in response to the bit suppression command 491 (FIG. 9E-(10)) on line 510 and the aforementioned $\phi 1$ clock pulse 490, which occurs $\frac{1}{2}$ cycle of 3SC or about 47 nanoseconds after the $\phi 2$ clock pulse. To insure that the counter 495 is not set and the bit suppression command not removed until after the $\phi 1$ clock pulse 490 has ended, the delay capacitors 498 and 499 are provided to delay the return of the counter 495 to its high set state, hence, disabling of the NAND gate 493 and to delay the return of NAND gate 493 to its low disabled state, hence, extending the duration of the bit suppression command 491. The effect of the delay is seen the rounded portions 508 and 509 of the waveforms (10) and (13) of FIG. 9E.

To disable the bit suppression logic circuitry 500, switch 480 is placed in the position that places a high level signal (ground in the channel encoder 453 of this apparatus) on the set line 510 for the counter 495. This places the counter permanently in its set state, thereby placing a disabling high level signal permanently at the wire-OR input of the NAND gate 493. Hence, bit suppression commands 491 can not be generated and bits will not be suppressed.

Commonly, self clocking channel encoded data code formats carry data and clock information as particularly placed transitions between two signal levels. When such encoded data is sent through a transmission channel, it usually experiences some timing distortion because of the non-linear characteristics of most transmission channels. If the timing distortion is significant, errors may result because of the inability of the channel decoder to determine the correct location of the transmitted transitions. Furthermore, at high data rates, such as found in the apparatus described herein, the timing distortion may result in unacceptable errors in the transmitted data. This is particularly the case where, as in the case of the channel codes selected for use in the apparatus herein, oppositely directed transitions carry the data and timing information. Non-linear transmission channels will alter the positively and negatively going transitions in a non-linear manner with respect to time. Hence, level sensitive data detectors commonly used at the terminal of a transmission channel to restore the transmitted data so that it has properly positioned transitions will position the positive and negative transitions differently. Different positioning occurs because a positive transition with substantial timing distortion will reach the level selected for sensing the presence of transitions at a time after its nominal position that is different from that required by a similarly distorted negative transition.

The data transmission system of the present invention enhances the reliability of transmission of channel encoded data in which oppositely directed transitions carry the data and clock information. More specifically, each of the channel encoders 453 encodes the data bit stream at its input by providing pulses in accordance with the rules of the selected channel code at the transition locations of the channel encoded format. In the particular channel encoder used in the apparatus described herein, logical 1 data bit pulses 515 (FIG. 9E-(7) and (14)) are provided at the data cell boundaries to define logical 1 bit related transistions that appear in the channel encoded data and logical 0 data bit pulses 489 (FIG. 9E-(6) and (14)) are provided at center of a data cell to define logical 0 bit related transitions that appear in the channel encoded data. The transition-related pulses are generated by the clock generator 456 to have a precisely defined edge, the leading edge being selected. The second clock generator 456 includes two one-shot multivibrators that are clocked by the oppositely phased 3SC clock signals provided by the first clock generator 468 over lines 472 and 473. Since the leading edges of the positive pulses generated by each of the one shot multivibrators are defined by rapidly switching the multivibrators from its stable state to its quasi-stable state (there being no significant time constant determining components involved), each leading edge will be identical to all others and occur at a precise time following the occurrence of the positive clocking transition of the clocking signal. The two multivibrators of the second clock generator 456 thusly provide $\phi 1$ and $\phi 2$ clock pulse trains, which in the embodiment described herein have a pulse width of about 17 nsec, with the leading edges of the pulses of each train precisely defined with respect to each other and those of the other train. As described hereinbefore, the $\phi 1$ clock pulses provided on line 475 are gated through the NAND gate 488 as logical 1 data bit transition related pulses that appear in the channel encoded data and the $\phi 2$ clock pulses provided on line 474 are gated through NAND gate 486 as logical 0 data bit transition related pulses that appear in the channel encoded data. Since the NAND gates 488 and 486 are in an enabled condition at the times the $\phi 1$ and $\phi 2$ are received for transmission as transition related pulses (FIG. 9E-(4), (7) and (14) for logical 1 bit pulses and FIG. 9E-(3), (4), (5), (6) and (14) for logical 0 bit pulses), their respective leading edges will not be noticeably affected by the transmission through the NAND gates. Because the transmission channel over which the pulses are sent will act on identical pulse edges the same, the precise locations of the transition-related positive pulse edges, hence, data signal transitions themselves, are not lost as a result of any distortion that may be introduced to the pulses by the action of the transmission channel.

Figures 13A, 13B:
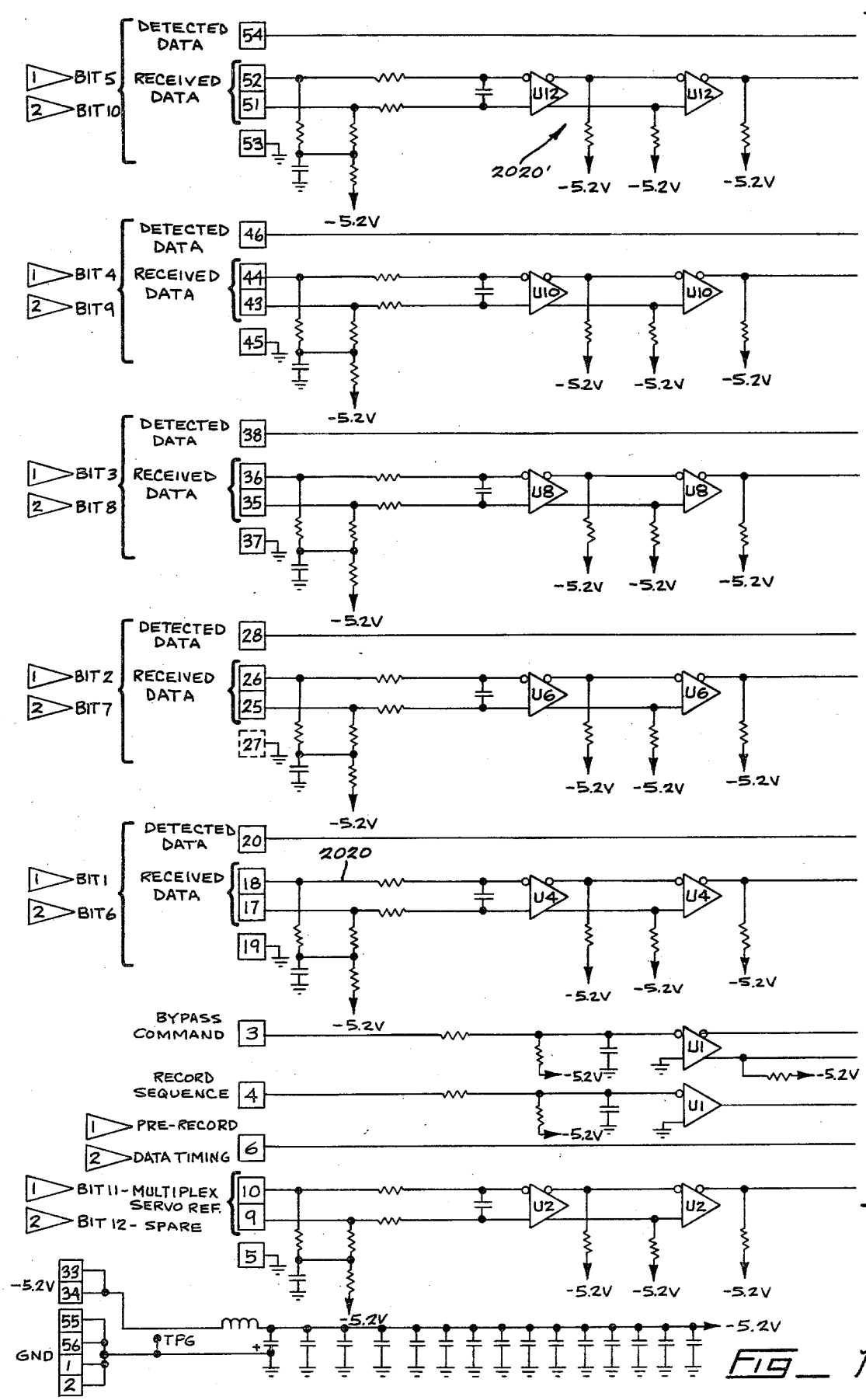
FIGS. 13A and 13B together comprise an electrical schematic diagram of the disc drive data interface portion of the apparatus.
Figure 13B:
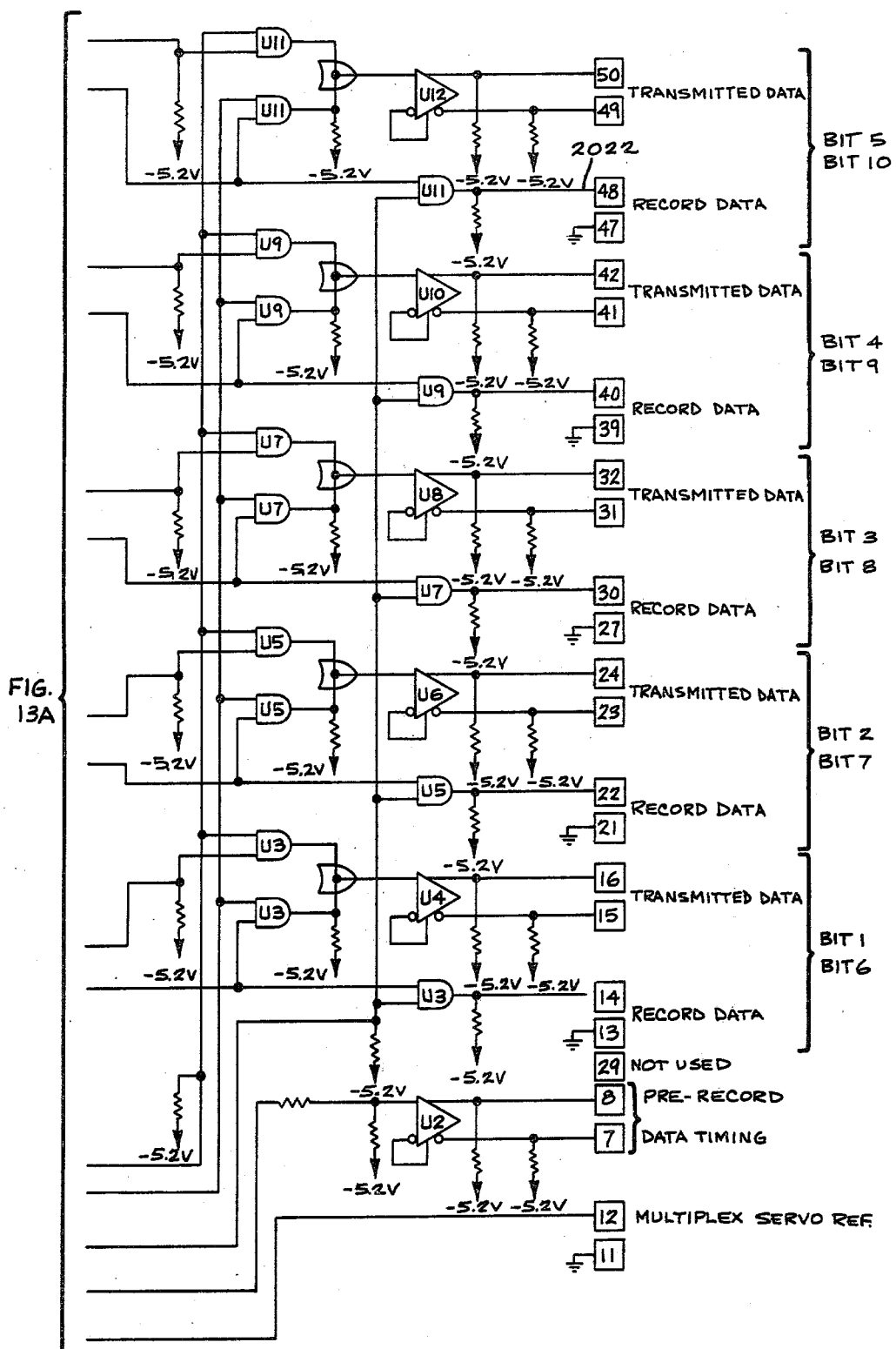

The channel encoded transition related pulses output by the encoder 96 over lines 451 are coupled to the transmission line 152 (FIG. 6) extending to the record amp and head switch 153 associated with the disc drives 73. The record signal interface 89 includes conventional logic converters which convert the TTL logic on lines 451 to emitter coupled logic levels which provide complementary level pulses on two lines in a manner that is described hereinbelow with reference to FIGS. 11A and 11B. The video data is passed to the selected drive's record amplifier and head switch circuitry 153 (FIGS. 12A and 12B). A divide by two JK flip flop 1070 included in each data bit line receives the transition related pulses and is responsive to the leading edges of the transmitted pulses to be rapidly switched between its two stable conduction states. This converts the transmitted pulse form of the channel encoded data to the level transition form for recording as transitions between two signal states. Prior to being converted by the JK flip-flop 1070, the transmitted pulses in each data bit line are passed through a differential amplifier line receiver 2020 (FIG. 13A) to regenerate the transmitted pulses with precisely defined leading edges after passage through the associated transmission line of the transmission line bus 152. The differential amplifier line receiver circuit 2020' is connected to reject common mode noise in the pair of complementary transition related pulses received from the transmission line pair included in the transmission line bus 152. In addition, the differential amplifier line receiver circuit 2020' regenerates a single transition related pulse from each transmitted pair of complementary transition related pulses so that the regenerated pulse has a well defined leading edge properly positioned according to the code rules of the channel code selected for originally encoding the video NRZ-L data. More specifically, the differential amplifier line receiver circuitry 2020' provides a single regenerated transition pulse with leading and trailing edges provided when the levels of the edges of the received complementary pulses are the same. By examining the edges of the transmitted complementary pulses in this manner, the leading edges of all regenerated pulses will be properly positioned according to the channel encoding rules because the same sense, i.e., leading positive going and leading negative going, edges of each pair of the complementary pulses are employed to define the occurrence of the leading edge of each regenerated transition related pulse. Because the transmission channel through which the transition related pulses are sent affect identical pulse edges the same, any time distortion introduced to the pulse edges will not effect the regeneration of the transition related pulses.

Following the regeneration of the transition related pulses, they are coupled to clock the aforementioned JK flip flop 1070 at each occurrence of a regenerated pulse, using the defined leading edge to effect clocking. Upon the occurrence of each regenerated transition related pulse, the flip flop 1070 is rapidly switched between its two stable conduction states by the leading edges of the regenerated pulses and thereby converts the pulse form of the channel encoded data to the level form for subsequent recording.

FIGS. 12A and 54B show consecutive parts of a detailed electrical circuit diagram including the record driver and playback preamplifier circuits of four identical data record and playback channels, designated 1058, 1059, 1060 and 1061 utilized in the video frame storage record and playback system. A fifth channel designated 1062 includes a servo track head permanently connected to a servo playback preamplifier and it also includes a data track record and playback channel. In the video frame storage record and playback system, five more data record and playback channels (not shown) identical with the above-indicated data record and playback channels shown in FIGS. 12A and 12B are utilized. A relay 1063 in channel 1058 is shown having its contacts in a position connecting one of the heads 1064 and 1065 for recording as occurs when a record command is received on line 1066. In absence of a record command, the relay 1063 is in the playback position. In this position, the contacts of relay 1063 are in their alternative positions. Heads 1064 and 1065 are utilized for both recording and playback and are switched alternatively for odd and even television fields. Switching of these heads 1064 or 1065 is controlled by the 30 Hz head switch signal continuously provided on line 1067. The playback data received alternatively from the heads 1064 and 1065 of the respective channels 1058, 1059, 1060 and 1061 is fed into the playback equalizer and data detector circuits associated with the respective channels such as shown in FIGS. 11A and 11B, which will be described briefly below.

Figure 11A:
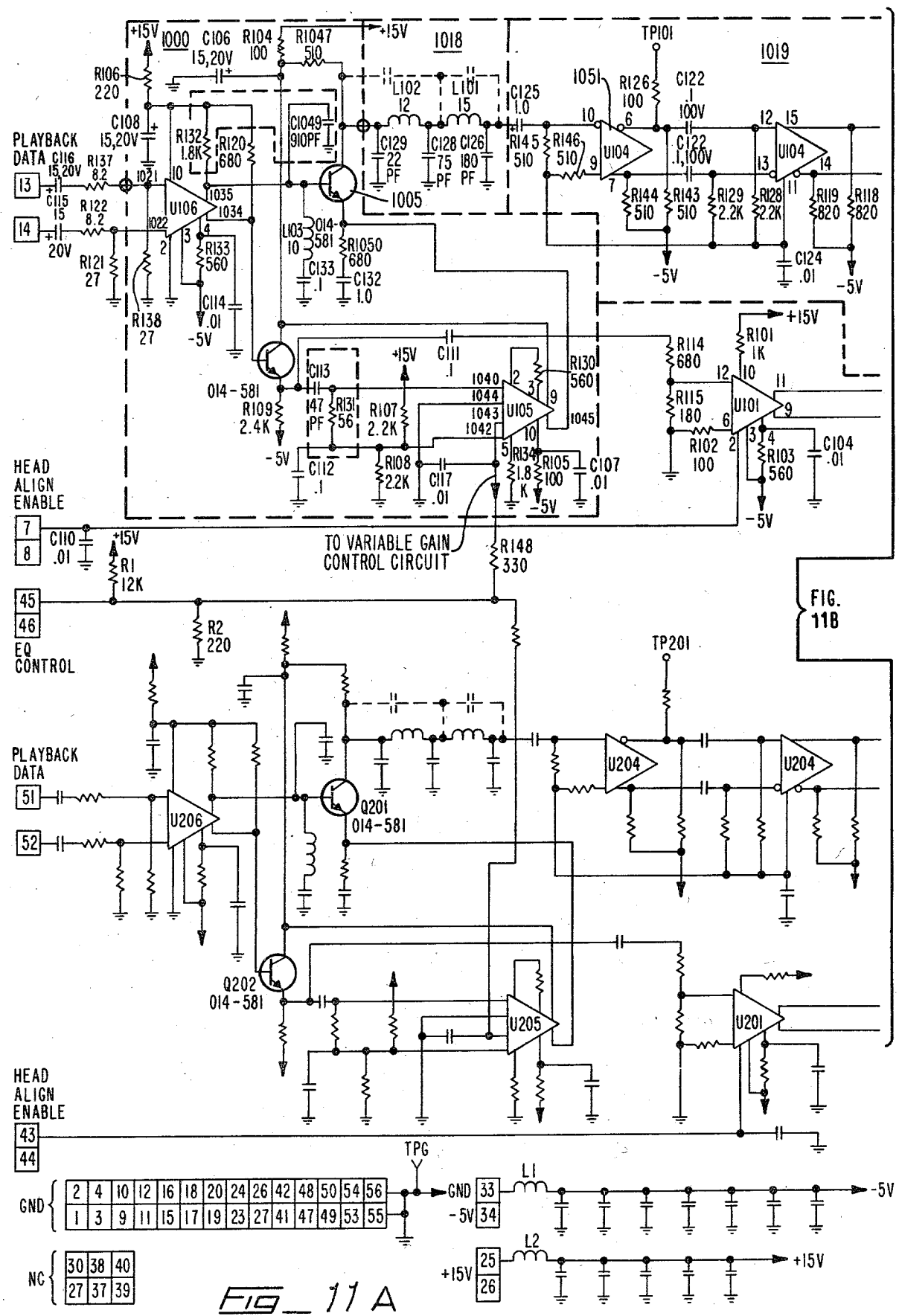
FIGS. 11A and 11B together comprise an electrical schematic diagram of the equalizer circuits of the signal system.
Figure 11B:
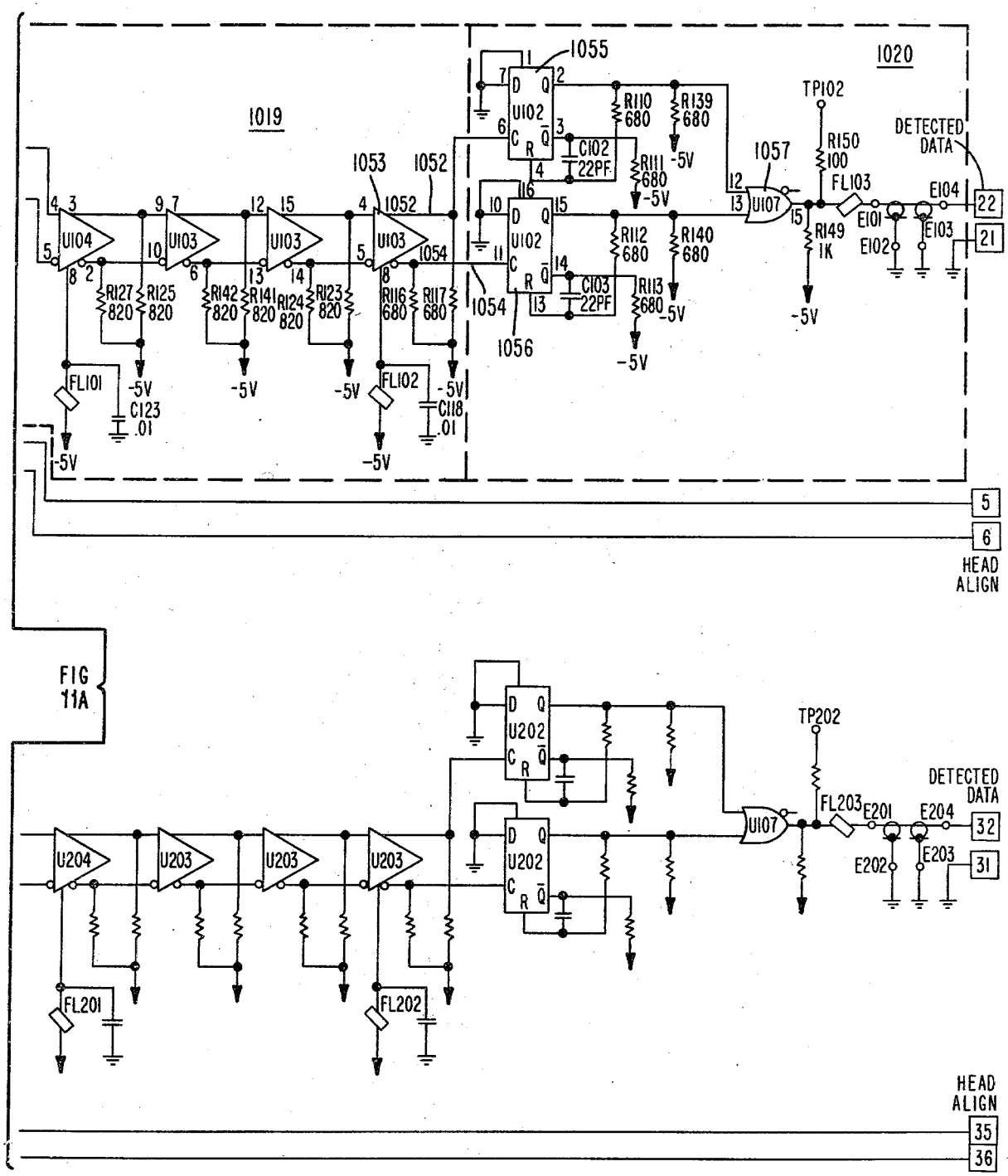

Another embodiment of the digital data transmission system of the present invention is employed in the data playback channel 91, the schematic diagram of which is shown by FIGS. 11A, 11B and 10A. More specifically, the equalizer 1000 converts the voltage peaks of the playback signal provided by the head and playback preamplifier 1001 (FIG. 12B), which represent zero crossings of the recorded flux, back into properly positioned zero crossings at the output of the equalizer. This equalized output signal is present at the collector of transistor 1005 of the equalizer and is filtered by a low pass filter circuit 1018 and thereafter fed through a first buffer amplifier 1051 arrange to provide complementary outputs of an amplifier-limiter circuit 1019. The output signal from the buffer amplifier is fed through a series of five amplitude-limiting amplifiers, preferably of the same type as the buffer amplifier. The equalized playback signal provided at the input of the amplitude-limiting circuit 1019 is in the channel encoded form with the transitions properly positioned. Amplitude limiting the playback signal serves to restore the rectangular shape of the playback data signal which has been considerably distorted by the record and reproduce processes. Furthermore, the buffer amplifiers of the amplitude-limiting circuit 1019 also serve to provide opposite phased waveforms of the restored data signal which are subsequently used to generate a pulse for each transition of the rectangularly shaped channel encoded playback data signal. As previously described herein with reference to the channel encoding of the data signals by the encoder 96 and subsequent recording of such signals, the transition-related pulses are generated so that a precisely defined edge, the leading edge being selected in this embodiment, can be sent through a transmission channel without introducing errors to the data although the data signal may be distorted by the channel. As described hereinbefore, the high bit rate data streams, such as processed by the apparatus described herein, are particularly susceptible to having errors introduced into them because of the differential response characteristics of transmission lines to different sensed signal level transitions, such as twisted pair transmission lines used to couple channel encoded data between disc drives and the signal system.

To generate a pulse for each transition of the playback data signal so that only leading, positive edges of the pulses identify the data signal transitions, the amplifier-limiter circuit 1019 provides two opposite phased waveforms of the data signal. First, a sequence of transitions between signal levels of non-inverted polarity is provided at the output terminal 1052 of the last amplifier 1053 of the series of amplitude-limiting amplifiers and second, an identical sequence of transitions between signal levels of inverted polarity is provided at the output terminal 1054 of the same amplifier 1053. Both these transition sequences have their transitions positioned according to the code rules of the channel code selected for originally encoding the video data and are applied respectively to clock two identical one-shot multivibrators 1055 and 1056 of the pulse former circuit 1020. Each multivibrator forms a positive pulse, respectively, for each positive going transition of the playback data signal received at its clock input. Consequently, the one-shot multivibrator 1055 receiving the non-inverted form of the playback data signal provides a positive pulse at each positive going transition in the data signal. On the other hand, the other one-shot multivibrator 1056 receiving the inverted form of the playback data signal provides a positive pulse at the location of each negative going transition in the data signal. Since the leading edges of the positive pulses generated by the multivibrators 1055 and 1056 are defined by rapidly switching the multivibrators from its stable state to its quasi-stable state (there being no significant time constant determining components involved), each leading edge will be identical to all others and occur at a precise time following the occurrence of the positive clocking transition of the playback data signal. Because the transmission channel over which the pulses are sent will act on identical pulse edges the same, the locations of the transition-related positive pulse edges, hence, data signal transitions themselves, are not lost as a result of any distortion that may be introduced to the pulses by the action of the transmission channel. If necesary, an amplitude level sensitive detector means can be coupled to the output of the transmission channel, such as is used at the input of the decoder circuitry portion of the decoder and time base corrector 100, to accurately redefine the relative locations of the playback data signal transitions.

For transmission of the transition related pulses to the signal system, the output pulses of both one shot multivibrators 1055 and 1056 are applied to separate inputs of a positive OR-gate 1057 which forms an output pulse for each input pulse. The output pulses of the OR-gate 1057 are applied to a conventional complementary output buffer amplifier arranged to receive a single input signal and generate coincident complementary output signal forms of the single input signal. The complementary buffer amplifier converts each transition related pulse provided by the OR-gate 1057 to a pair of coincident complementary level pulses, which are coupled for transmission of the selected playback channel 91 for decoding of the playback data and subsequent processing to recover the original color television signal.

The playback data is coupled by the transmission lines 154 to the decoder and time base corrector 100 of the playback channel 91. Before decoding the channel encoded data, the pulse-form of the encoded data is first converted to the signal level transition form. Referring to FIG. 10A, a pair of input terminals 526 are coupled to a differential amplifier line receiver circuit 527 connected to receive the pair of complementary transition related pulses from the transmission line pair included in the transmission line bus 154 extending from the playback amplifier and head switch circuitry (FIG. 7). The differential amplifier line receiver circuit 527 operates in the manner of the previously described amplifier 2020' to regenerate a single transition related pulse from each transmitted pair of complementary transition related pulses so that the regenerated pulse has a well defined leading edge properly positioned according to the code rules of the channel code selected for originally encoding the video NRZ-L data.

Following the regeneration of the single transition related pulse from each complementary pair, it is coupled over line 528 to clock a one shot multivibrator 529, using the defined leading edge to effect clocking. The one shot 529 is rapidly switched from its stable conduction state to its quasi-stable conduction state to provide the precisely defined leading edge of the transition related pulses. The one shot 529 has one of its outputs connected to line 530a that extends to the clock input of a divide by two flip flop 531. Upon the occurrence of each regenerated transition related pulse, the flip flop 531 is rapidly switched between its two stable conduction states by the leading edges of the regenerated pulses and thereby converts the pulse form of the channel encoded data to the level on line 531a form for subsequent decoding of the data back to its original NRZ-L form.

What is claimed is:

1. Apparatus for transmitting a digital data stream through a transmission channel, said digital data stream of the type wherein digital data is defined in consecutive bit cell intervals of certain length and level transitions determine the data content of said digital data stream, and wherein degradation of the transitions can occur upon transmission of the digital data stream through said transmission channel because of differing transmission channel responsive characteristics with respect to level transistions of opposite directions between two signal state levels, comprising:

means for generating a pair of coincident pulses in response to the occurrence of each level transition condition within said digital data stream, said coincident pulses of a duration substantially shorter than said bit cell interval;

means for applying each of the coincident pulses to a separate line for transmission therethrough; and means connected to said separate lines for receiving transmitted coincident pulses and responsively producing a level transition on a single output line in response to the instantaneous levels on both of said separate lines reaching a selected magnitude.

2. Apparatus as defined in claim 1 wherein said means for receiving transmitted coincident pulses and responsively producing a level transition includes means for generating a narrow pulse in response to the receipt of each pair of transmitted coincident pulses with the leading edge of said narrow pulse generated when the instantaneous levels of both of said coincident pulses reaches said selected magnitude, and means responsive to the leading edge of said narrow pulse for producing said level transition on said output line.

3. Apparatus as defined in claim 1 wherein said means for generating a pair of coincident pulses includes means for generating a transition related pulse signal in response to the occurrence of each level transition condition within said digital data stream with an edge defined relative to the occurrence of the level transition condition, and pulse complementary means responsive to each transition related pulse signal for generating the pair of coincident pulses in the form of complementary level pulses with one pair of the coincident edges defined relative to said edge of said transition related pulse.

4. Apparatus as defined in claim 3 wherein the content of said digital data stream is defined by the position of a level transition within the bit cell, there being two locations for a level transition in each of said bit cells, and wherein said means for generating the transition related pulse signal includes means for generating a first transition related pulse in response to the occurrence of a level transition condition at one of said locations in said bit cell and a second transition related pulse in response to the occurence of a level transition condition at the other of said locations in said bit cell, said first and second transition related pulses coupled to said pulse complementing means.

5. Apparatus as defined in claim 4 wherein said means for generating first and second transition related pulses comprises:
- a first monostable multivibrator continuously clocked to produce first pulses at a time corresponding to said one of said level transition locations for said bit cells;
- a second monostable multivibrator continuously clocked to produce second pulses at a time corresponding to said other of said level transition locations for said bit cells; and
- gate means responsive to the occurrence of said level transition conditions occurring in said digital data stream and the pulses produced by the first and second monostable multivibrators to generate said first and second transition related pulses.

6. Apparatus as defined in claim 3 wherein the means for generating a narrow pulse generates the leading edge of each narrow pulse when the instantaneous levels of both of said complementary level pulses of each pair of coincident pulses reaches corresponding complementary magnitudes.

7. Apparatus as defined in claim 3 wherein said means for generating a transition related pulse generates said transition related pulse in response to a signal level transition in the digital data stream.

* * * * *